US009120483B2

(12) United States Patent
Sato et al.

(10) Patent No.: US 9,120,483 B2
(45) Date of Patent: Sep. 1, 2015

(54) GEAR-SHIFT INSTRUCTION DEVICE FOR HYBRID VEHICLE

(75) Inventors: Keita Sato, Toyota (JP); Eiji Fukushiro, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/353,477

(22) PCT Filed: Nov. 24, 2011

(86) PCT No.: PCT/JP2011/077084
§ 371 (c)(1),
(2), (4) Date: Apr. 22, 2014

(87) PCT Pub. No.: WO2013/076851
PCT Pub. Date: May 30, 2013

(65) Prior Publication Data
US 2014/0257653 A1    Sep. 11, 2014

(51) Int. Cl.
*G06F 17/00*     (2006.01)
*B60W 20/00*    (2006.01)
*B60K 6/445*     (2007.10)
*B60W 50/14*    (2012.01)
*F16H 63/42*    (2006.01)

(52) U.S. Cl.
CPC ........... *B60W 20/40* (2013.01); *B60K 6/445* (2013.01); *B60W 20/10* (2013.01); *B60W 50/14* (2013.01); *F16H 63/42* (2013.01); *B60W 2510/10* (2013.01); *B60Y 2400/71* (2013.01); *F16H 2063/426* (2013.01); *Y02T 10/6239* (2013.01); *Y10S 903/902* (2013.01)

(58) Field of Classification Search
None
See application file for complete search history.

(56) References Cited

U.S. PATENT DOCUMENTS

| 6,404,332 | B1 | 6/2002 | Wakashiro et al. |
| 7,601,093 | B2 * | 10/2009 | Tabata et al. ............... 477/5 |
| 8,224,535 | B2 * | 7/2012 | Tabata et al. ............. 701/51 |
| 2009/0236159 | A1 | 9/2009 | Shibata et al. |

(Continued)

FOREIGN PATENT DOCUMENTS

| EP | 1 068 976 B1 | 12/2005 |
| EP | 2 574 829 A1 | 4/2013 |
| JP | A-62-023826 | 1/1987 |
| JP | A-2001-027321 | 1/2001 |
| JP | A-2004-257511 | 9/2004 |
| JP | 2007-118722 A | 5/2007 |

(Continued)

OTHER PUBLICATIONS

Dec. 20, 2011 International Search Report issued in International Patent Application No. PCT/JP2011/077084.

*Primary Examiner* — Dirk Wright
(74) *Attorney, Agent, or Firm* — Oliff PLC

(57) ABSTRACT

In a gear-shift instruction device for the hybrid vehicle that includes an engine that can output power for running, an electric motor (such as a motor-generator and a motor) that can output power for running, a power transmission system that transmits power to a drive wheel and can manually select a gear shift position, and a gear-shift instruction unit that prompts a change of the gear shift position to a driver, modes of the guide for gear shift are different between during electric motor running (EV running) and during hybrid running (HV running) for a same accelerator depression amount and vehicle speed in a state that allows manual gear shift operation (manual gear shift mode). This ensures the compatibility between: improvement in energy efficiency and fuel consumption by the gear shift instruction; and reduction in burden of the driver due to gear shifting based on the gear shift instruction.

10 Claims, 20 Drawing Sheets

(56) References Cited

U.S. PATENT DOCUMENTS

2012/0158262 A1* 6/2012 Nishida et al. ............... 701/55
2014/0366670 A1* 12/2014 Tanaka et al. ............ 74/473.12

FOREIGN PATENT DOCUMENTS

| JP | B2-5321737 | 10/2013 |
| WO | WO 2011/135697 A1 | 11/2011 |

* cited by examiner

DURING SHIFT-UP
INSTRUCTION

—67

—68

DURING SHIFT-DOWN
INSTRUCTION

| | C0 | C1 | C2 | B0 | B1 | B2 | B3 | GEAR SHIFT RATIO | STEP |
|---|---|---|---|---|---|---|---|---|---|
| 1st | ◎ | ○ | | | | | ○ | 3.357 | 1.54 |
| 2nd | ◎ | ○ | | | | ○ | | 2.180 | 1.53 |
| 3rd | ◎ | ○ | | | ○ | | | 1.424 | 1.42 |
| 4th | ◎ | ○ | ○ | | | | | 1.000 | 1.42 |
| 5th | | ○ | ○ | ◎ | | | | 0.705 | TOTAL 4.76 |
| R | | | ○ | | | | ○ | 3.209 | |
| N | ○ | | | | | | | | |

○ ENGAGED  ◎ ENGAGED IN STEP-VARIABLE SHIFTING STATE, RELEASED IN CONTINUOUSLY-VARIABLE SHIFTING STATE

GEAR-SHIFT INSTRUCTION DEVICE FOR HYBRID VEHICLE

TECHNICAL FIELD

The present invention relates to a gear-shift instruction device for a hybrid vehicle.

BACKGROUND ART

In recent years, from the viewpoint of environmental protection, emission reduction of exhaust gas from an engine (internal combustion engine) mounted on a vehicle and improvement in fuel consumption rate (fuel consumption) are desired. As a vehicle that satisfies these requirements, a hybrid vehicle has been developed and put into practical use.

The hybrid vehicle includes an engine and an electric motor (such as a motor-generator and a motor). The electric motor is driven by electric power generated due to the output of the engine or by electric power stored in a battery (an electric storage device). The hybrid vehicle can run using one or both of the engine and the electric motor as a running drive-force source.

Vehicles such as a hybrid vehicle include a vehicle that can select a manual gear shift mode (sequential mode). This type of vehicle is equipped with a gear-shift instruction device (generally referred to as a gear shift indicator (GSI)) (for example, see Patent Literature 1). The gear-shift instruction device provides a gear shift instruction (gear shift guide) for prompting the driver to perform a gear shift operation (an up-shift or a down-shift) in the case where the selected gear shift position is different from the appropriate gear shift position (for example, a recommended gear shift position that allows improving the fuel consumption rate (fuel consumption) obtained from an engine load, a vehicle speed, and similar parameter, during running in the manual gear shift mode.

CITATION LIST

Patent Literature

PATENT LITERATURE 1: Japanese Unexamined Patent Application Publication No. 2001-027321
PATENT LITERATURE 2: Japanese Unexamined Patent Application Publication No. 2004-257511

SUMMARY OF INVENTION

Technical Problem

The hybrid vehicle allows hybrid running (hereinafter also referred to as HV running) for running in a state where the engine is operated and the electric motor running (hereinafter also referred to as EV running) for running using power of the electric motor alone. Accordingly, for example, due to the difference between these running modes during EV running and during HV running, it is required to ensure the compatibility between: improvement in fuel consumption and energy efficiency by the gear shift instruction; and reduction in burden of the driver due to shifting gears based on the gear shift instruction. However, a technique for realizing this requirement has not been established.

The present invention has been achieved in view of the above circumstances, it is an object of the present invention to provide a hybrid vehicle with a gear-shift instruction device that can ensure the compatibility between: improvement in fuel consumption and energy efficiency by a gear shift instruction; and reduction in burden of a driver due to shifting gears based on the gear shift instruction.

Solutions to the Problems

The present invention is a gear-shift instruction device for a hybrid vehicle. The hybrid vehicle includes an engine, an electric motor (such as a motor-generator), a gear shifting unit, and a gear-shift instruction unit. The engine is configured to output power for running. The electric motor is configured to output power for running. The gear shifting unit is configured to perform manual gear shifting. The gear shifting unit is disposed at a power transmission system. The power transmission is configured to transmit power to a drive wheel. The gear-shift instruction unit is configured to perform gear shift guide for prompting a manual gear shift operation of the gear shifting unit. The gear-shift instruction device for the hybrid vehicle has a technical feature with modes of the guide for gear shift are different between during electric motor running (EV running) and during hybrid running (HV running) for a same accelerator depression amount and vehicle speed in a state that allows the manual gear shift operation. The electric motor running allows running only with the power of the electric motor. The hybrid running allows running in a state where the engine is operated.

More specifically, the modes of the guide for gear shift position are different between during electric motor running and during hybrid running for the same accelerator depression amount (accelerator position) and vehicle speed even in the same gear shift position.

Here, the term "during the electric motor running" of the present invention means the case where engine stop conditions (conditions, for example, the remaining capacity State of Charge (SOC) of an electric storage device is equal to or more than a predetermined value, the range of an output limitation Wout and the range of an input limitation Win of the electric storage device are equal to or more than respective predetermined values, the temperature (battery temperature) of the electric storage device is equal to or more than a predetermined value, and the engine rotation speed is equal to or less than a predetermined value) are satisfied. That is, this means a state in which the engine is stopped and running is performed by the electric motor (motor-generator) alone.

Additionally, the term "during the hybrid running" means a state that is not the above-described electric motor running. That is, this means a state in which the engine stop condition is not satisfied and running with the engine alone or running with the engine and the electric motor is performed.

Additionally, the term "running mode" means a running configuration (EV running mode) including during the above-described electric motor running (during EV running), during an electric motor running priority state (during a EV running priority state) described later, a running configuration (HV running mode) including during the above-described hybrid running (during HV running) and during a hybrid running priority state (an HV running priority state) described later, and similar configuration.

The term "gear shift position" of the present invention includes a gear shift ratio fixed in each stage (gear shift position) and a gear shift ratio with a constant range in each stage. This gear shift ratio with a constant range means a linear range of for example, automatic gear shifting and a range like a step of step-variable shifting and a range hold type (this range hold type will be described later). As a concept of "stage" in case of this range hold type, for example, in a vehicle that has a range for enhancing the braking force by an engine brake (engine brake range; B range), this B range is also included in the meaning of the term "stage." Furthermore, the term "gear shifting unit" of the present invention includes, in addition to a step-variable shifting unit that mechanically forms the gear shift positions, a gear shifting unit such as a continuously-variable shifting unit (such as a planetary gear mechanism and a belt-type continuously variable transmission) in a configuration that simulates the gear shift position by some control.

According to the present invention, in the state that allows the manual gear shift operation (the manual gear shift mode), the modes of the guide for gear shift are different between during EV running and during HV running for the same accelerator depression amount and vehicle speed. This ensures the compatibility between: improvement in fuel consumption, energy efficiency, and driving performance by the gear shift instruction; and reduction in burden felt by the driver due to the gear shift instruction.

A specific configuration of the present invention can be configured as follows. During EV running in the state that allows the manual gear shift operation (the manual gear shift mode), the gear shift guide by the gear-shift instruction unit is not performed (shift instruction is not performed). Employing this configuration eliminates the occasion for performing the gear shift guide focusing on the fuel consumption during EV running. This allows reducing the burden felt by the driver due to the gear shift instruction during EV running.

A specific configuration of the present invention can be configured as follows. The gear shifting unit is configured to shift multi-stage gears by manual gear shifting. In the state that allows the manual gear shift operation (the manual gear shift mode), a gear shift position subjected to a gear shift instruction is limited (for example, a gear shift position is limited up to the third gear shift position in five forward speeds) during the electric motor running compared with during the hybrid running.

With this configuration, during EV running in the state that allows the manual gear shift operation (the manual gear shift mode), the gear shift guide is not performed on all the gear shift positions of the power transmission system. The range of the gear shift position on which the gear shift guide is performed is limited. This allows reducing occasions of the gear shift guide during EV running compared with during HV running. This allows reducing the burden felt by the driver during EV running.

A specific configuration of the present invention can be configured as follows. The gear shifting unit is configured to shift multi-stage gears by manual gear shifting. In the state that allows the manual gear shift operation (the manual gear shift mode), when a gear shift position difference from the optimal gear shift position (for example, the gear shift position in which the electric motor has the optimal efficiency) is large during EV running compared with during HV running, a gear shift instruction is performed.

Thus, during EV running in the state that allows the manual gear shift operation, the gear shift instruction is performed only in the case where the gear shift position difference between the optimal gear shift position and the current gear shift position is large (for example, in the case where the difference is equal to or more than two stages). This allows reducing occasions of the gear shift guide during EV running compared with during HV running, thus reducing the burden felt by the driver during EV running. Moreover, this allows the operation point of the electric motor to approach the optimal efficiency line during EV running, thus improving the operational efficiency of the electric motor so as to reduce the energy consumption.

A specific configuration of the present invention can be configured as follows. During EV running in the state that allows the manual gear shift operation (the manual gear shift mode), the gear shift guide is performed only in the case where an operation point of the electric motor becomes close to an operation point at which EV running by this electric motor cannot continue, to a predetermined degree.

Thus, during EV running in the state that allows the manual gear shift operation (the manual gear shift mode), the gear shift guide is performed only in the case where the operation point of the electric motor becomes close to the operation point at which EV running cannot continue, to the predetermined degree (for example, the degree that a transition from EV running to HV running is predicted). This allows reducing occasions of the gear shift guide during EV running compared with during HV running, thus reducing the burden felt by the driver during EV running.

Another configuration of the present invention may be configured as follows. In a gear-shift instruction device for a hybrid vehicle, the hybrid vehicle includes an engine, an electric motor (such as a motor-generator), a gear shifting unit, and a gear-shift instruction unit. The engine is configured to output power for running. The electric motor is configured to output power for running. The gear shifting unit is configured to perform manual gear shifting. The gear shifting unit is disposed at a power transmission system. The power transmission is configured to transmit power to a drive wheel. The gear-shift instruction unit is configured to perform gear shift guide for prompting a manual gear shift operation of the gear shifting unit. The modes of the guide for gear shift are different between during an electric motor running priority state (an EV running priority state) and during a hybrid running priority state (an HV running priority state) for the same accelerator depression amount and vehicle speed in a state that allows the manual gear shift operation.

More specifically, the modes of the guide for gear shift position are different between during the electric motor running priority state and during the hybrid running priority state for the same accelerator depression amount (accelerator position) and vehicle speed even in the same gear shift position.

Here, the EV running priority state is a state to give priority to EV running as much as possible in the case where the remaining capacity SOC of the electric storage device is equal to or more than a predetermined value or in the case where the driver operates a switch for an EV priority mode or similar. Here, in this EV running priority state, for example, a driving force may be temporarily output from the engine or the engine may be started for charging.

The HV running priority state is a state that is not the EV running priority state described above, and a state in which running with the engine alone, running with the engine and the electric motor, running with the electric motor alone, and similar running are performed. Basically, this state is a state operating such that the remaining capacity SOC of a charging device is maintained at a predetermined value or operating such that the remaining capacity SOC of the charging device is increased.

According to this invention, in the state that allows the manual gear shift operation (the manual gear shift mode), the modes of the guide for gear shift are different between during the EV running priority state and during the HV running priority state for the same accelerator depression amount and vehicle speed. This ensures the compatibility between: improvement in fuel consumption, energy efficiency, and driving performance by the gear shift instruction; and reduction in burden felt by the driver due to the gear shift instruction.

A specific configuration of this invention can be configured as follows. During the EV running priority state in the state that allows the manual gear shift operation (the manual gear shift mode), the gear shift guide by the gear-shift instruction unit is not performed (the shift instruction is not performed). Employing this configuration eliminates the occasion for performing a gear shift guide focusing on the fuel consumption during the EV running priority state. This allows reducing the burden felt by the driver during running in the EV running priority state.

A specific configuration of this invention can be configured as follows. The gear shifting unit is configured to shift multi-stage gears by manual gear shifting. In the state that allows the manual gear shift operation (the manual gear shift mode), a gear shift position subjected to a gear shift instruction is limited (for example, a gear shift position is limited up to the third gear shift position in five forward speeds) during the EV running priority state compared with during the HV running priority state.

With this configuration, during the EV running priority state in the state that allows the manual gear shift operation (the manual gear shift mode), the gear shift guide is not performed on all the gear shift positions of the power transmission system. The range of the gear shift position on which the gear shift guide is performed is limited. This allows reducing occasions of the gear shift guide during the EV running priority state compared with during running in the HV running priority state. This allows reducing the burden felt by the driver during the EV running priority state.

A specific configuration of this invention can be configured as follows. The gear shifting unit is configured to shift multi-stage gears by manual gear shifting. In the state that allows the manual gear shift operation (the manual gear shift mode) of these gears, when a gear shift position difference from the optimal gear shift position (for example, the gear shift position in which the electric motor has the optimal efficiency) is large during the EV running priority state compared with during the HV running priority state, a gear shift instruction is performed.

Thus, during the EV running priority state in the state that allows the manual gear shift operation, the gear shift instruction is performed only in the case where the gear shift position difference between the optimal gear shift position and the current gear shift position is large (for example, in the case where the difference is equal to or more than two stages). This allows reducing occasions of the gear shift guide during the EV running priority state compared with during the HV running priority state, thus reducing the burden felt by the driver during the EV running priority state. Moreover, this allows the operation point of the electric motor to approach the optimal efficiency line during running in the EV running priority state, thus improving the operational efficiency of the electric motor so as to reduce the energy consumption.

A specific configuration of the present invention can be configured as follows. During the EV running priority state in the state that allows the manual gear shift operation (the manual gear shift mode), the gear shift guide is performed only in the case where an operation point of the electric motor becomes close to an operation point at which EV running by the electric motor cannot continue, to a predetermined degree.

Thus, during the EV running priority state in the state that allows the manual gear shift operation (the manual gear shift mode), the gear shift guide is performed only in the case where the operation point of the electric motor becomes close to the operation point at which the running cannot continue, to the predetermined degree (for example, the degree that a transition from the EV running priority state to the HV running priority state is predicted). This allows reducing occasions of the gear shift guide during the EV running priority state compared with during the HV running priority state, thus reducing the burden felt by the driver during running in the EV running priority state.

Advantageous Effects of Invention

According to the present invention, in the state that allows the manual gear shift operation, the modes of the guide for gear shift are different between during the hybrid running (or during the hybrid running priority state) and during the electric motor running (or during the electric motor running priority state) for the same accelerator depression amount and vehicle speed. This ensures the compatibility between: improvement in fuel consumption and energy efficiency by the gear shift instruction; and reduction in burden on the driver due to gear shifting based on the gear shift instruction.

BRIEF DESCRIPTION OF THE DRAWINGS

FIG. 9 includes diagrams illustrating respective lighting states of a shift-up lamp and a shift-down lamp.

FIG. 16 is an operation table in the case where a driving device mounted on the hybrid vehicle in FIG. 14 performs continuously-variable or step-variable shifting operation.

DESCRIPTION OF EMBODIMENTS

Hereinafter, embodiments of the present invention will be described with reference to the accompanying drawings.

Embodiment 1

Figure 1:
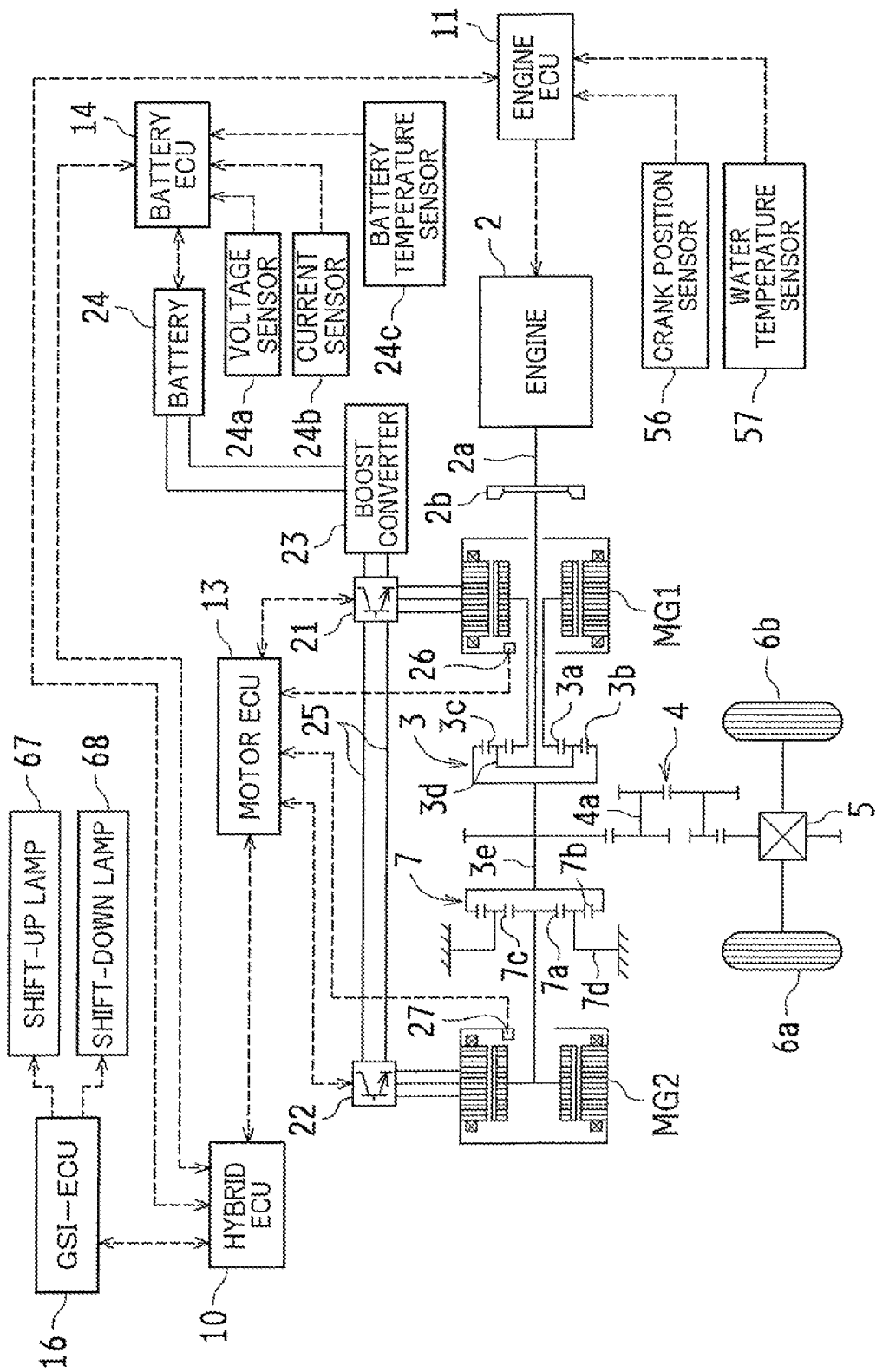
FIG. 1 is a schematic configuration diagram illustrating one example of a hybrid vehicle to which the present invention is applied.

FIG. 1 is a schematic configuration diagram illustrating one example of a hybrid vehicle to which the present invention is applied.

This hybrid vehicle 1 illustrated in FIG. 1 is a front-engine front-drive (FF) hybrid vehicle 1 that includes an engine 2, a tri-axial power split mechanism 3, a first motor-generator MG1, and a second motor-generator MG2 as a drive system for providing a driving force to drive wheels (front wheels) 6a and 6b. The power split mechanism 3 is coupled to a crankshaft 2a as an output shaft of the engine 2 via a damper 2b. The first motor-generator MG1 is coupled to this power split mechanism 3 and can generate electric power. The second motor-generator MG2 is coupled to a ring gear shaft 3e as a drive shaft coupled to the power split mechanism 3 via a reduction mechanism 7. These crankshaft 2a, power split mechanism 3, first motor-generator MG1, second motor-generator MG2, reduction mechanism 7, and ring gear shaft 3e constitute a driving power transmission system in the present invention.

The above-described ring gear shaft 3e is coupled to the drive wheels 6a and 6b via a gear mechanism 4 and a differential gear 5 for front wheels.

This hybrid vehicle 1 also includes a hybrid electronic control unit (hereinafter referred to as a hybrid ECU) 10 that controls the entire drive system of the vehicle.

—Engine and Engine ECU—

The engine 2 is an internal combustion engine that outputs power using hydrocarbon-based fuel such as gasoline and light oil. An engine electronic control unit (hereinafter referred to as an engine ECU) 11, which receives signals from various sensors for detecting the operating state of the engine 2, performs operation controls such as a fuel injection control, an ignition control, and an intake air amount adjustment control.

The engine ECU 11 performs communication with the hybrid ECU 10, performs operation control of the engine 2 based on a control signal from this hybrid ECU 10, and outputs data related to the operating state of the engine 2 to the hybrid ECU 10 as necessary. Here, the engine ECU 11 is coupled to a crank position sensor 56, a water temperature sensor 57, and similar sensor. The crank position sensor 56 outputs a detection signal (pulse) for every rotation of the crankshaft 2a by a certain angle. The engine ECU 11 calculates an engine rotation speed Ne based on the output signal from this crank position sensor 56. The water temperature sensor 57 outputs a detection signal corresponding to a cooling water temperature of the engine 2.

—Power Split Mechanism—

The power split mechanism 3 is, as illustrated in FIG. 1, constituted as a planetary gear mechanism. The planetary gear mechanism includes a sun gear 3a as an external gear, a ring gear 3b as an internal gear, a plurality of pinion gears 3c, and a planetary carrier 3d. The ring gear 3b is arranged concentrically with the sun gear 3a. The plurality of pinion gears 3c meshes with the sun gear 3a and meshes with the ring gear 3b. The planetary carrier 3d holds this plurality of pinion gears 3c to allow free rotation and revolution of the plurality of pinion gears 3c. The planetary gear mechanism provides a differential action using the sun gear 3a, the ring gear 3b, and the planetary carrier 3d as rotational elements. In this power split mechanism 3, the planetary carrier 3d is coupled to the crankshaft 2a of the engine 2. The sun gear 3a is coupled to a rotor (rotating element) of the first motor-generator MG1 while the ring gear 3b is coupled to the above-described reduction mechanism 7 via the above-described ring gear shaft 3e.

In the power split mechanism 3 thus configured, when a reaction force torque due to the first motor-generator MG1 is input to the sun gear 3a with respect to the output torque of the engine 2 input to the planetary carrier 3d, a torque larger than the torque input from the engine 2 is generated at the ring gear 3b as an output element. In this case, the first motor-generator MG1 functions as an electric generator. When the first motor-generator MG1 functions as an electric generator, the driving force of the engine 2 input from the planetary carrier 3d is distributed to the sun gear 3a side and the ring gear 3b side corresponding to the respective gear ratios.

On the other hand, at the time of a start request for the engine 2, the first motor-generator MG1 functions as an electric motor (starter motor). The driving force of this first motor-generator MG1 is provided to the crankshaft 2a via the sun gear 3a and the planetary carrier 3d to cause cranking of the engine 2.

In the power split mechanism 3, when the rotation speed (output-shaft rotation speed) of the ring gear 3b is constant, changing the rotation speed of the first motor-generator MG1 in an increasing and decreasing manner allows continuously (steplessly) changing the rotation speed of the engine 2. That is, the power split mechanism 3 functions as a gear shifting unit.

—Reduction Mechanism—

The above-described reduction mechanism 7 includes, as illustrated in FIG. 1, a sun gear 7a as an external gear, a ring gear 7b as an internal gear, a plurality of pinion gears 7c, and a planetary carrier 7d. The ring gear 7b is arranged concentrically with this sun gear 7a. The plurality of pinion gears 7c meshes with the sun gear 7a and meshes with the ring gear 7b. The planetary carrier 7d holds this plurality of pinion gears 7c to allow free rotation of the plurality of pinion gears 7c. In this reduction mechanism 7, the planetary carrier 7d is secured to a transmission case while the sun gear 7a is coupled to a rotor (rotating element) of the second motor-generator MG2, and the ring gear 7b is coupled to the above-described ring gear shaft 3e.

—Power Switch—

In the hybrid vehicle 1, a power switch 51 (see FIG. 2) for switching start and stop of the hybrid system is disposed. The power switch 51 is, for example, a rebounding push switch that alternately switches switch-On and switch-Off every push operation. Here, the hybrid system is a system that employs the engine 2 and the motor-generators MG1 and MG2 as driving force sources for running and controls running of the hybrid vehicle 1 by execution of various controls including the operation control of the engine 2, driving controls of the motor-generators MG1 and MG2, a cooperative control of the engine 2 and the motor-generators MG1 and MG2, and similar control.

In the case where the power switch 51 is operated by an occupant including the driver, the power switch 51 outputs a signal (an IG-On instruction signal or an IG-Off instruction signal) corresponding to this operation, to the hybrid ECU 10. The hybrid ECU 10 starts or stops the hybrid system based on the signal output from the power switch 51 or similar signal.

Specifically, in the case where the power switch 51 is operated during stop of the hybrid vehicle 1, the hybrid ECU 10 starts the above-described hybrid system in P position. Accordingly, the vehicle becomes a state that allows running. Here, when the hybrid system is started during vehicle stop, the hybrid system is started in the P position. Even in an accelerator-on state, the driving force is not output. The state that allows running of the vehicle is a state where vehicle running can be controlled by an instruction signal of the hybrid ECU 10 and a state (Ready-On state) where the hybrid vehicle 1 can start moving and run when the driver presses on the accelerator. Here, the Ready-On state includes a state (a state that allows EV running) where the second motor-generator MG2 allows the hybrid vehicle 1 to start moving and running during stop of the engine 2.

The hybrid ECU 10 stops the hybrid system, for example, in the case where the power switch 51 is operated (for example, pushed for a short period of time) when the hybrid system is being started and the gear shift position is in the P position during vehicle stop.

—Shift Operation Device and Gear Shift Mode—

Figure 2:
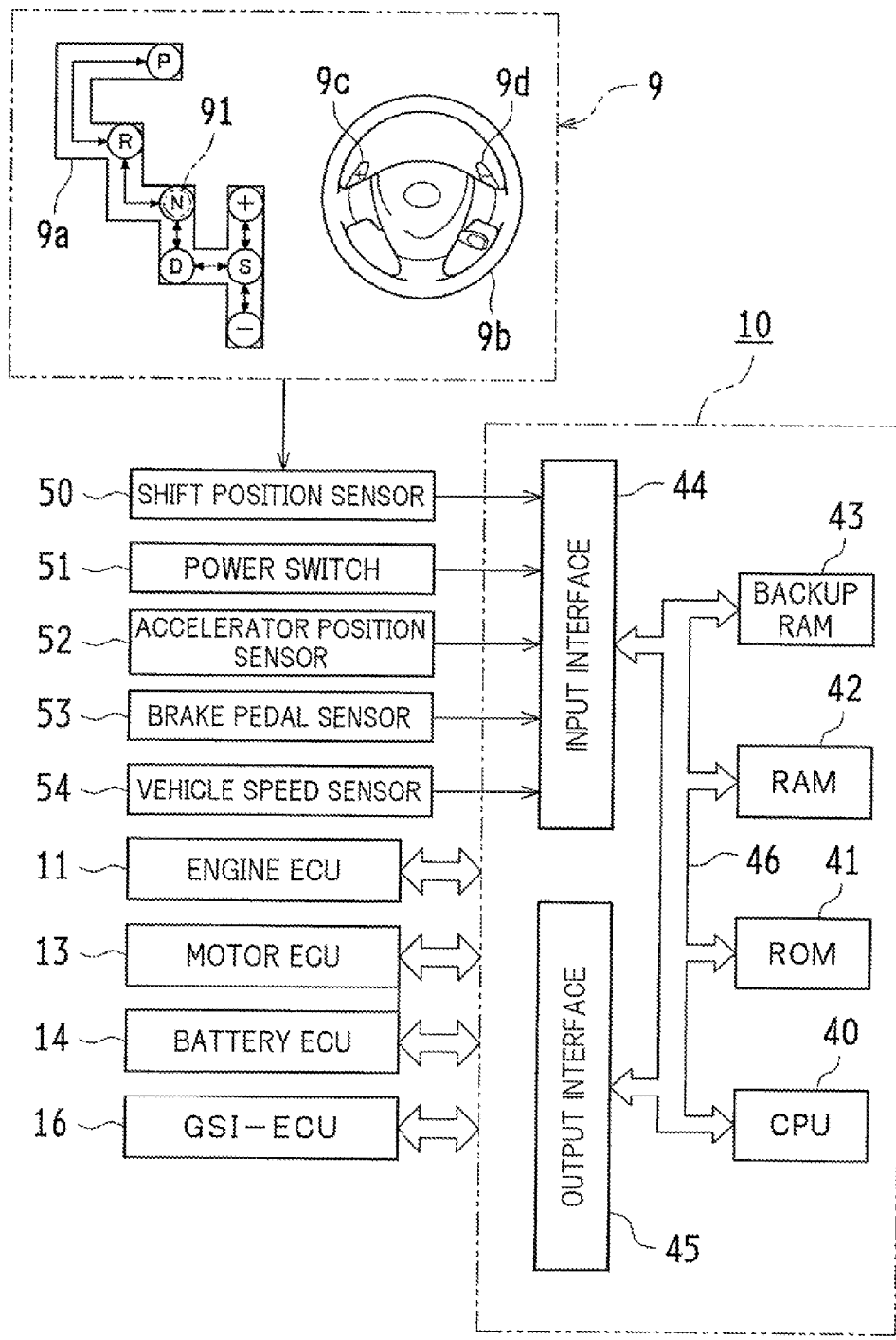
FIG. 2 is a block diagram illustrating a schematic configuration of a control system of the hybrid vehicle in FIG. 1.

In the hybrid vehicle 1 of this embodiment, a shift operation device 9 as illustrated in FIG. 2 is disposed. This shift operation device 9 includes a shift lever 91 that is arranged in the vicinity of the driver's seat and allows shifting operation. In the shift operation device 9, a shift gate 9a is formed. The shift gate 9a has a parking position (P position), a reverse position (R position), a neutral position (N position), a drive position (D position), and a sequential position (S position) so as to allow the driver to shift the shift lever 91 to a desired position. The respective positions of these P position, R position, N position, D position, and S position (including the "+" position and the "−" position below) are detected by a shift position sensor 50.

In a state where the above-described shift lever 91 is operated to the "D position", the hybrid system is set to an "automatic gear shift mode" so as to perform an electrical-type continuously-variable shifting control in which the gear shift ratio is controlled to set the operating point of the engine 2 on the optimal fuel consumption operation line described later.

On the other hand, in a state where the above-described shift lever 91 is operated in the "S position", the hybrid system is set to a "manual gear shift mode (sequential shift mode (S mode))." In the front and back of this S position, a "+" position and a "−" position are disposed. The "+" position is a position to which the shift lever 91 is operated when a manual up-shift is performed. The "−" position is a position to which the shift lever 91 is operated when a manual down-shift is performed. When the shift lever 91 is in the S position, operating the shift lever 91 to the "+" position or the "−" position from the S position as the neutral position (manual gear shift operation) allows up-shifting or down-shifting a pseudo gear shift position (for example, a gear shift position established by adjusting the engine rotation speed using the control of the first motor-generator MG1) established by the hybrid system. Specifically, the gear shift position is shifted up by one stage (for example, 1st to 2nd to 3rd to 4th to 5th to 6th) for every operation to the "+" position. On the other hand, the gear shift position is shifted down (for example, 6th to 5th to 4th to 3rd to 2nd to 1st) for every operation to the "−" position. Here, the number of stages that can be selected in this manual gear shift mode is not limited to "six stages" and may be a different number of stages (such as "four stages" and "eight stages").

Here, the concept of the manual gear shift mode in the present invention is not limited to the case where the above-described shift lever 91 is in the sequential position (S position). When the range positions include "2 (2nd)", "3 (3rd)", and similar position, this concept includes the case where the shift lever is operated to the range positions of "2 (2nd)" and "3 (3rd)." For example, in the case where the shift lever is operated from the drive position to the range position of "3 (3rd)", the mode transitions from the automatic gear shift mode to the manual gear shift mode.

At a steering wheel 9b arranged in front of the driver's seat (see FIG. 2), paddle switches 9c and 9d are disposed. These paddle switches 9c and 9d have lever shapes and include an shift-up paddle switch 9c and a shift-down paddle switch 9d. The shift-up paddle switch 9c is used for outputting an instruction signal to request an up-shift in the manual gear shift mode. The shift-down paddle switch 9d is used for outputting an instruction signal to request a down-shift. A symbol of "+" is attached to the shift-up paddle switch 9c while a symbol of "−" is attached to the shift-down paddle switch 9d. In the case where the shift lever 91 is operated to the "S position" and the "manual gear shift mode" is activated, the shift-up paddle switch 9c is operated (operated to be pulled to the near side) to up-shift the gear shift position by one stage for every operation. On the other hand, when the shift-down paddle switch 9d is operated (operated to be pulled to the near side), the gear shift position is shifted down by one stage for every operation.

Accordingly, in the hybrid system according to this embodiment, when the shift lever 91 is operated to the "D position" and the "automatic gear shift mode" is activated, a driving control is performed such that the engine 2 is efficiently operated. Specifically, the hybrid system is controlled such that the driving operation point of the engine 2 is on the optimal fuel consumption line. On the other hand, when the shift lever 91 is operated to the "S position" and the "manual gear shift mode (S mode)" is set, a gear shift ratio that is a ratio of the rotation speed of the engine 2 with respect to the rotation speed of the ring gear shaft 3e can be changed corresponding to the gear shift operation of the driver, for example, to six stages (1st to 6th).

—Motor-Generator and Motor ECU—

The motor-generators MG1 and MG2 are each constituted of a well-known synchronous generator-motor that can be driven as an electric generator and can be driven as an electric motor. The motor-generators MG1 and MG2 supply/receive electric power with a battery (electric storage device) 24 via respective inverters 21 and 22 and a boost converter 23. The respective inverters 21 and 22, the boost converter 23, and the battery 24 are coupled to one another by electric power lines 25. The electric power lines 25 are constituted as a positive electrode bus bar and a negative electrode bus bar that are shared by the respective inverters 21 and 22, and allows electric power generated by one of the motor-generators MG1 and MG2 to be consumed in the other motor. Accordingly, the battery 24 is charged and discharged due to the electric power generated any of the motor-generators MG1 and MG2 or due to the shortage of the electric power. Here, in the case where the charge and discharge of the electric power are balanced by the motor-generators MG1 and MG2, the battery 24 is not charged or discharged.

The motor-generators MG1 and MG2 are both drivingly controlled by a motor electronic control unit (hereinafter referred to as a motor ECU) 13. This motor ECU 13 receives signals required for driving controls of the motor-generators MG1 and MG2, for example, signals from an MG1 rotation speed sensor (resolver) 26 and an MG2 rotation speed sensor 27 that detect respective rotation positions of the rotors (rotating shafts) of the motor-generators MG1 and MG2 and respective phase currents that are detected by the current sensor and applied to the motor-generators MG1 and MG2. The motor ECU 13 outputs switching control signals to the inverters 21 and 22. For example, any of the motor-generators MG1 and MG2 is drivingly controlled as an electric generator (for example, a regeneration control of the second motor-generator MG2 is performed) or drivingly controlled as an electric motor (for example, a power running control of the second motor-generator MG2 is performed). Additionally, the motor ECU 13 communicates with the hybrid ECU 10. In accordance with a control signal from this hybrid ECU 10, the motor ECU 13 drivingly controls the motor-generators MG1 and MG2 described above and outputs data related to the operating state of the motor-generators MG1 and MG2 to the hybrid ECU 10 as necessary.

—Battery and Battery ECU—

The battery 24 is managed by a battery electronic control unit (hereinafter referred to as a battery ECU) 14. This battery ECU 14 receives signals required for managing the battery 24, for example, an inter-terminal voltage from a voltage sensor 24a mounted across the terminals of the battery 24, a charge/discharge current from a current sensor 24b mounted on an electric power line 25 coupled to the output terminal of the battery 24, and a battery temperature Tb from a battery temperature sensor 24c mounted on the battery 24. The battery ECU 14 outputs data related to the state of the battery 24 to the hybrid ECU 10 via communication as necessary.

To manage the battery 24, the battery ECU 14 calculates the remaining capacity State of Charge (SOC) of electric power based on the integrated value of the charge/discharge current detected by the current sensor 24b. Based on the calculated remaining capacity SOC and the battery temperature Tb detected by the battery temperature sensor 24c, the battery ECU 14 calculates an input limitation Win and an output limitation Wout that are the maximum permissible powers to allow charging and discharging the battery 24. Here, the input limitation Win and the output limitation Wout of the battery 24 are set by setting respective basic values of the input limitation Win and the output limitation Wout based on the battery temperature Tb, setting a correction coefficient for input limitation and a correction coefficient for output limitation based on the remaining capacity SOC of the battery 24, and multiplying the above-described set basic values of the input limitation Win and the output limitation Wout by the above-described correction coefficients.

—Hybrid ECU and Control System—

The above-described hybrid ECU 10 includes, as illustrated in FIG. 2, a central processing unit (CPU) 40, a read only memory (ROM) 41, a random access memory (RAM) 42, a backup RAM 43, and similar member. The ROM 41 stores various control programs, a map referenced during the execution of these various control programs, and similar information. The CPU 40 executes the various control programs stored in the ROM 41 and various arithmetic processings based on the map. The RAM 42 is a memory that temporarily stores the result of the arithmetic operation in the CPU 40, data received from each sensor, and similar information. The backup RAM 43 is a non-volatile memory that stores, for example, data to be stored during IG-Off and similar data.

The CPU 40, the ROM 41, the RAM 42, and the backup RAM 43 described above are coupled together via a bus 46 and are coupled to an input interface 44 and an output interface 45.

The input interface 44 is coupled to the above-described shift position sensor 50, the above-described power switch 51, an accelerator position sensor 52, a brake pedal sensor 53, and a vehicle speed sensor 54, and similar member. The accelerator position sensor 52 outputs a signal corresponding to the depression amount of an accelerator pedal. The brake pedal sensor 53 outputs a signal corresponding to the depression amount of a brake pedal. The vehicle speed sensor 54 outputs a signal corresponding to a vehicle body speed.

Accordingly, the hybrid ECU 10 receives a shift position signal from the shift position sensor 50, the IG-On signal and the IG-Off signal from the power switch 51, an accelerator position signal from the accelerator position sensor 52, a brake-pedal-position signal from the brake pedal sensor 53, a vehicle speed signal from the vehicle speed sensor 54, and similar signal.

The input interface 44 and the output interface 45 are coupled to the engine ECU 11, the motor ECU 13, the battery ECU 14, and a gear shift indicator (GSI)-ECU 16 described later. The hybrid ECU 10 transmits and receives various control signals and data to/from these engine ECU 11, motor ECU 13, battery ECU 14, and GSI-ECU 16.

—Flow of Driving Force in Hybrid System—

The hybrid vehicle 1 thus configured calculates a torque (required torque) to be output to the drive wheels 6a and 6b based on an accelerator position Acc corresponding to the depression amount of the accelerator pedal by the driver and a vehicle speed V. Operation controls of the engine 2 and the motor-generators MG1 and MG2 are performed to ensure running by a required driving force corresponding to this required torque. Specifically, to ensure reduction in fuel consumption amount, the second motor-generator MG2 is used in an operating region in which the required driving force is comparatively low to achieve the above-described required driving force. On the other hand, in an operating region in which the required driving force is comparatively high, the second motor-generator MG2 is used and the engine 2 is driven to achieve the above-described required driving force using the driving force from these driving sources (running drive-force sources).

More specifically, in the case where the operational efficiency of the engine 2 is low during starting the vehicle, during low-speed running, or similar case, the running is performed with the second motor-generator MG2 alone (hereinafter referred to as "EV running" in other words). Also in the case where the driver selects the EV running mode using a running-mode selecting switch (a switch for an EV priority mode) arranged in the vehicle cabin, EV running is performed.

On the other hand, during normal running (hereinafter also referred to as HV running), for example, the above-described power split mechanism 3 splits the driving force of the engine 2 into two paths (torque split). One driving force is used for direct drive (drive with direct torque) of the drive wheels 6a and 6b while the other driving force is used for driving the first motor-generator MG1 so as to perform electric generation. At this time, the electric power generated by driving the first motor-generator MG1 is used to drive the second motor-generator MG2 so as to secondary drive (drive with the electrical path) the drive wheels 6a and 6b.

Accordingly, the above-described power split mechanism 3 functions as a differential mechanism. The differential action of the power split mechanism 3 mechanically transmits a main portion of the power from the engine 2 to the drive wheels 6a and 6b, and electrically transmits the remaining portion of the power from the engine 2 using the electrical path from the first motor-generator MG1 to the second motor-generator MG2. This provides a function as an electrical-type continuously variable transmission in which the gear shift ratio is electrically changed. Accordingly, without depending on the rotation speed and the torque of the drive wheels 6a and 6b (the ring gear shaft 3e), this allows freely manipulating the engine rotation speed and the engine torque and allows obtaining the operating state of the engine 2 with the optimized fuel consumption rate while obtaining the driving force required for the drive wheels 6a and 6b.

During high-speed running, the electric power from the battery 24 is additionally supplied to the second motor-generator MG2 to increase the output of this second motor-generator MG2 so as to additionally apply a driving force (driving force assistance; power running) to the drive wheels 6a and 6b.

Furthermore, during deceleration, the second motor-generator MG2 functions as an electric generator, and then generates regenerative power and stores the recovered electric power in the battery 24. Here, in the case where the amount of charge of the battery 24 is reduced and charging is especially required, the output of the engine 2 is increased to increase the power generation amount by the first motor-generator MG1 so as to increase the amount of charge to the battery 24. During low-speed running, a control for increasing the driving amount of the engine 2 may be performed as necessary, for example, in the case where charging the battery 24 is required as described above, in the case where an auxiliary machine such as an air conditioner is driven, and in the case where the temperature of the cooling water for the engine 2 is increased to a predetermined temperature.

In the hybrid vehicle 1 of this embodiment, the engine 2 is stopped to improve the fuel consumption depending on the operating state of the vehicle and the state where of the battery 24. Afterward, the operating state of the hybrid vehicle 1 and the state of the battery 24 are detected again so as to restart the engine 2. Accordingly, in the hybrid vehicle 1, intermittent operation (operation in which engine stop and restart are repeated) of the engine 2 is performed even when the power switch 51 is in an ON position.

In this embodiment, the engine intermittent operation is, for example, permitted in the case where the gear shift position during the S mode is equal to or more than an engine-intermittent-operation permitting stage (engine intermittence permission) and prohibited in the case where the gear shift position during the S mode is lower than the engine-intermittent-operation permitting stage (engine intermittent prohibition).

—Basic Control in Manual Transmission Mode—

Next, a basic control of the hybrid system in the above-described "manual gear shift mode" will be described.

Figure 3:
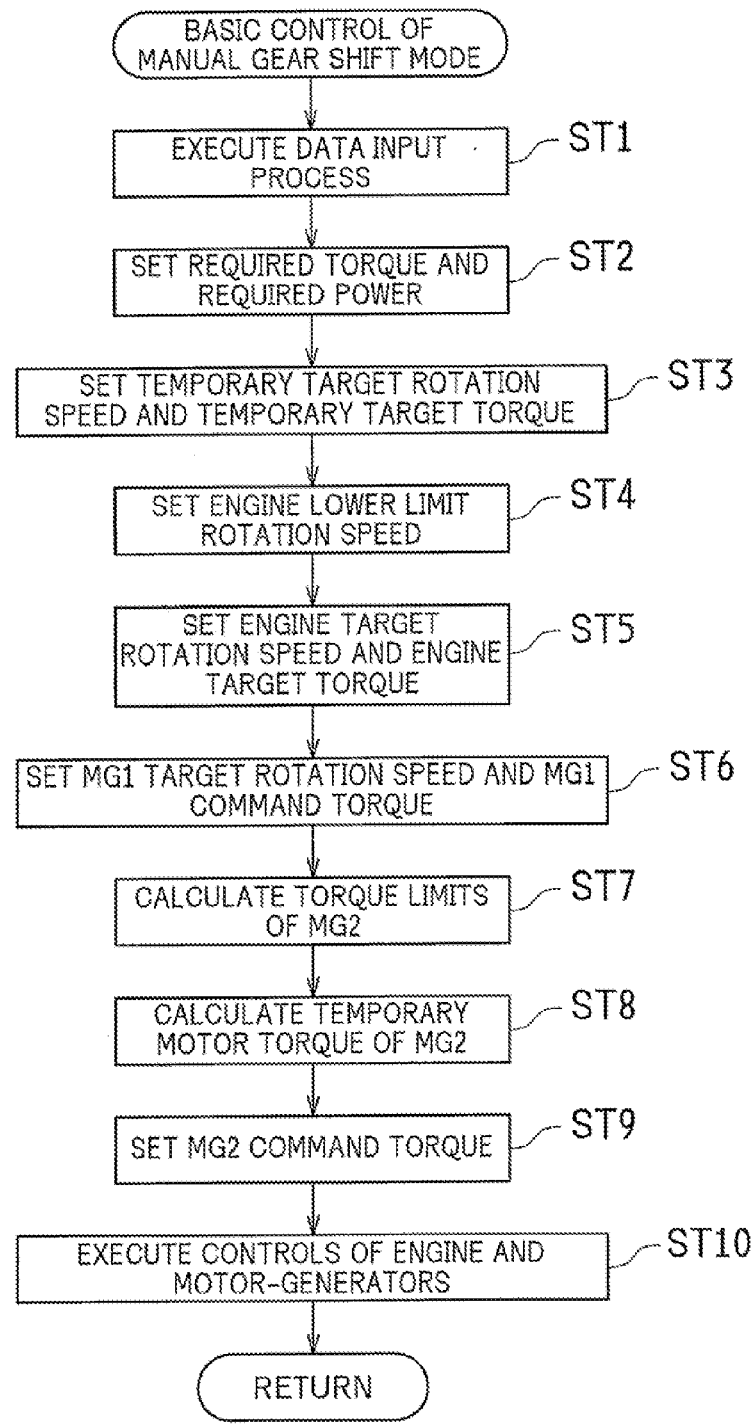
FIG. 3 is a flowchart illustrating a procedure of a basic control in a manual gear shift mode.

FIG. 3 is a flowchart illustrating a procedure of the basic control in the manual gear shift mode executed by the hybrid ECU 10 when the shift lever 91 is operated to the S position by the driver in the accelerator-on state. This flowchart is repeatedly executed at a predetermined time interval (for example, every several msec).

Firstly, in step ST1, a process for inputting data required for control is executed. The data includes the gear shift position recognized by the output signal from the shift position sensor 50 (the gear shift position selected in the manual gear shift mode; hereinafter referred to as a "shift position SP" in some cases), the accelerator position Acc obtained by the output signal from the accelerator position sensor 52, the vehicle speed V obtained by the output signal from the vehicle speed sensor 54, respective rotation speeds Nm1 and Nm2 of the motor-generators MG1 and MG2 obtained by the output signals from the MG1 rotation speed sensor 26 and the MG2 rotation speed sensor 27, a charge-discharge required power Pb, and the input limitation Win and the output limitation Wout that are allowable electric powers for charging and discharging the battery 24.

The information of the rotation speeds Nm1 and Nm2 of the above-described motor-generators MG1 and MG2 are input from the motor ECU 13 to the hybrid ECU 10. As the charge-discharge required power Pb, data that is set as an electric power to charge and discharge the battery 24 by the battery ECU 14 based on the remaining capacity SOC of the battery 24 or similar data is input from this battery ECU 14 to the hybrid ECU 10. Furthermore, the input limitation Win as a charge allowable power that is an electric power allowable for charging the battery 24 and the output limitation Wout as a discharge allowable power that is an electric power allowable for discharging the battery 24 are set based on the battery temperature Tb detected by the battery temperature sensor 24c and the remaining capacity SOC of the battery 24. These input limitation Win and output limitation Wout are input from this battery ECU 14 to the hybrid ECU 10.

After the data input process in step ST1, the process proceeds to step ST2. A required torque Tr to be output to the ring gear shaft 3e is set based on the input shift position SP, accelerator position Acc, and vehicle speed V. Subsequently, a required power Pe required for the engine 2 is set.

In this embodiment, a required-torque setting map is stored in the ROM 41. In required-torque setting map, a relationship between the shift position SP, the accelerator position Acc, the vehicle speed V, and the required torque Tr are preliminarily determined. This required-torque setting map is referred to extract the required torque Tr corresponding to the shift position SP, the accelerator position Acc, and the vehicle speed V.

Figure 4:
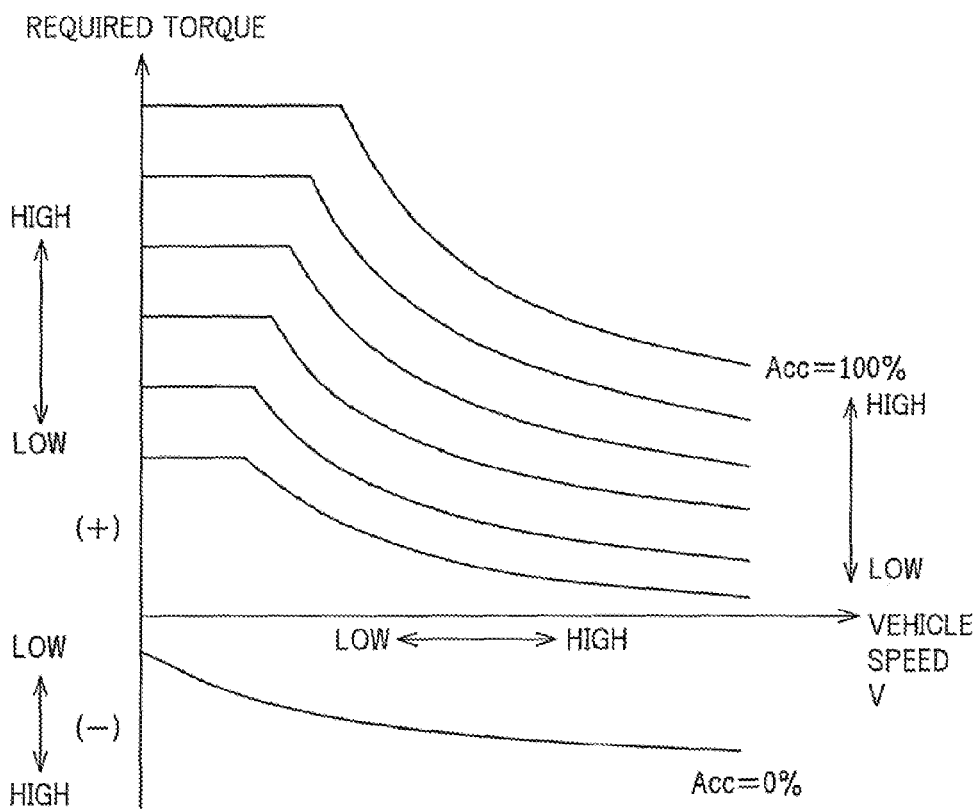
FIG. 4 is a graph illustrating a required-torque setting map.

FIG. 4 illustrates one example of the required-torque setting map. This required-torque setting map in FIG. 4 is a map for obtaining a required torque from the driver using the vehicle speed V and the accelerator position Acc as parameters, and illustrates a plurality of characteristic lines corresponding to different accelerator positions Acc. Among these characteristic lines, the characteristic line illustrated as the highest stage corresponds to an accelerator position for fully open (Acc=100%). The characteristic line corresponding to a fully closed state of the accelerator position Acc is illustrated as "Acc=0%." These characteristic lines have characteristics in which the required torque from the driver to generate a braking force becomes relatively high as the vehicle speed V becomes higher speed.

The above-described required power Pe is calculated as a sum of the multiplication (Tr×Nr) of the required torque Tr obtained from the required-torque setting map in FIG. 4 by a rotation speed Nr of the ring gear shaft 3e, the charge-discharge required power Pb (in which a discharge requiring side is assumed to be the positive side), and a loss Loss.

Subsequently, the process proceeds to step ST3. A temporary target rotation speed Netmp and a temporary target torque Tetmp as a temporary target driving operation point (operation point) of the engine 2 are set based on the required power Pe set in step ST2. In this embodiment, the temporary target rotation speed Netmp and the temporary target torque Tetmp of the engine 2 are set based on an operation line (hereinafter referred to as the "optimal fuel consumption operation line" in some cases) for efficiently operating the engine 2 and the required power Pe. The optimal fuel consumption operation line is preliminarily determined as a restriction on setting the driving operation point for normal running (for HV running)

Figure 5:
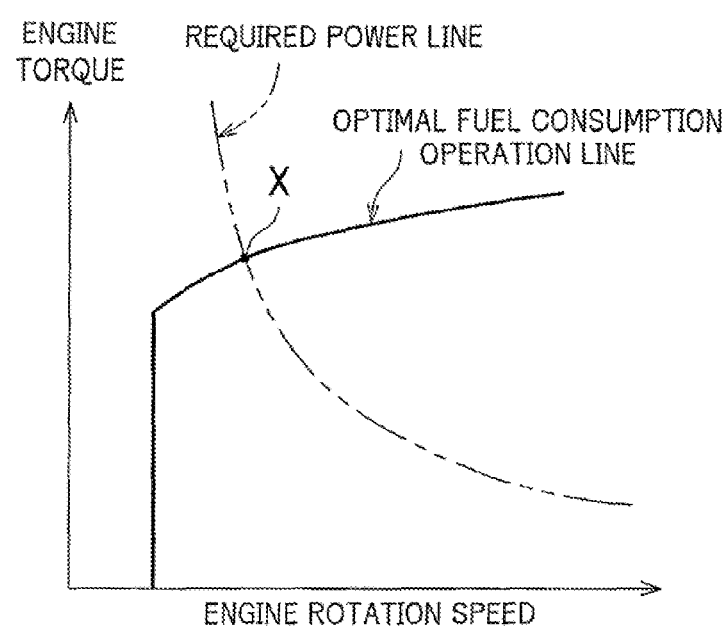
FIG. 5 is a graph illustrating an example of an optimal fuel consumption operation line and a required power line of an engine.

FIG. 5 illustrates examples of the optimal fuel consumption operation line of the engine 2 and a correlation curve (a required power line) between a rotation speed Ne and a torque Te. As illustrated in FIG. 5, the temporary target rotation speed Netmp and the temporary target torque Tetmp are obtained as an intersection point (the point X in the drawing) between the above-described optimal fuel consumption operation line and the correlation curve (the required power line) indicative of a constant required power Pe (Ne×Te).

After the temporary target rotation speed Netmp and the temporary target torque Tetmp of the engine 2 are set as described above, the process proceeds to step ST4. An engine lower limit rotation speed Nemin that is the lower limit value of the rotation speed Ne of the engine 2 is set based on the shift position SP and the vehicle speed V that are input as described above.

In the hybrid vehicle 1 according to this embodiment, when the sequential position is selected as the shift position SP, the engine lower limit rotation speed Nemin is preliminarily set corresponding to the vehicle speed V and the shift position SP (1st to 6th).

Figure 6:
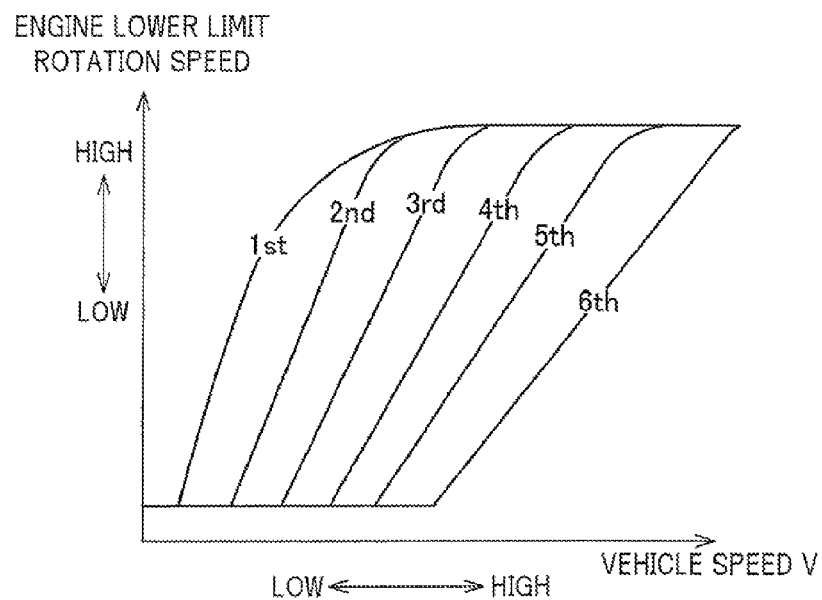
FIG. 6 is a graph illustrating an engine-lower-limit-rotation-speed setting map.

FIG. 6 illustrates an engine-lower-limit-rotation-speed setting map in which a relationship between the shift position SP, the vehicle speed V (or the rotation speed of the ring gear shaft 3e), and the engine lower limit rotation speed Nemin is preliminarily determined. This engine-lower-limit-rotation-speed setting map is stored in the ROM 41 of the hybrid ECU 10. As the engine lower limit rotation speed Nemin, the rotation speed corresponding to a given vehicle speed V and shift position SP are extracted from this map and set.

Figure 7:
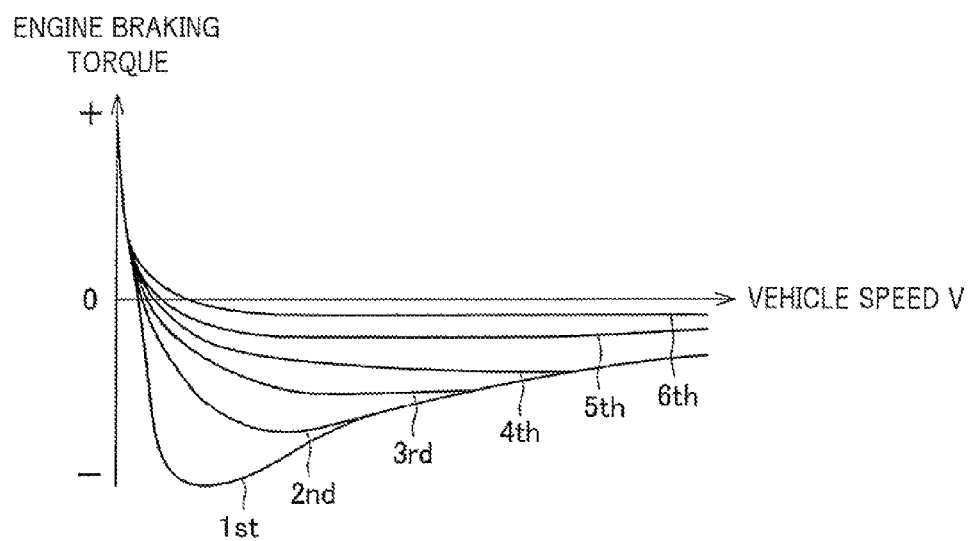
FIG. 7 is a graph illustrating characteristics of an engine brake obtained corresponding to a vehicle speed and a gear shift position.

That is, the shift positions 1st to 6th are associated with mutually different operation-point setting restrictions (the target-rotation-speed setting restrictions) of the engine 2. Specifically, the engine lower limit rotation speed Nemin is set to a lower value as the number of the stages of the shift position SP with respect to the same vehicle speed V becomes higher (approaches 6th from 1st). This is because the reduction in engine rotation speed is restricted more as the gear shift position becomes lower (the gear shift ratio becomes large) to generate a sufficient braking force in the case where the friction of the engine 2 is used to cause the resistance component to function as an engine brake (a braking force on the drive wheels 6a and 6b) when the accelerator position Acc is small or in an accelerator-off state, so as to simulate the same engine brake as that of a vehicle with a manual transmission. Setting this engine lower limit rotation speed Nemin varies the amount of an engine braking torque (a torque acting as a braking force to the drive wheels 6a and 6b) corresponding to the gear shift position and the vehicle speed as illustrated in FIG. 7. Accordingly, a large engine braking torque can be obtained as the gear shift position becomes at the lower side (at larger gear shift ratio side) even at the same vehicle speed (the same vehicle speed equal to or more than a predetermined vehicle speed).

After the engine lower limit rotation speed Nemin is set as described above, the process proceeds to step ST5. The higher rotation speed of the temporary target rotation speed Netmp and the engine lower limit rotation speed Nemin is set as the target rotation speed Ne of the engine 2. Additionally, the required power Pe set in step ST2 is divided by the target rotation speed Ne so as to set the target torque Te of the engine 2.

Subsequently, the process proceeds to step ST6. The target rotation speed Ne that is set as described above, the rotation speed Nr of the ring gear shaft 3e, and a gear ratio ρ (the number of teeth of the sun gear 3a/the number of teeth of the ring gear 3b) of the power split mechanism 3 are used to calculate a target rotation speed Nm1 of the first motor-generator MG1. Subsequently, a command torque Tm1 of the first motor-generator MG1 is set based on this calculated target rotation speed Nm1 and the current rotation speed Nm1.

After the command torque Tm1 of the first motor-generator MG1 is set as described above, the process proceeds to step ST7. The deviation between: the input/output limits Win and Wout of the battery 24; and the power consumption (generated electric power) of the first motor-generator MG1 obtained as a product of the command torque Tm1 and the rotation speed Nm1 of the current first motor-generator MG1, is divided by the rotation speed Nm2 of the second motor-generator MG2 so as to calculate the torque limits Tmin and Tmax as upper and lower limits of the torque that is allowed to be output from the second motor-generator MG2.

Subsequently, in step ST8, a temporary motor torque Tm2tmp as a torque to be output from the second motor-generator MG2 is calculated based on the required torque Tr, the command torque Tm1, and the gear ratio ρ of the power split mechanism 3 described above, and a gear ratio Gr of the reduction mechanism 7. In step ST9, a command torque Tm2 of the second motor-generator MG2 is set as a value obtained by limiting the temporary motor torque Tm2tmp using the torque limits Tmin and Tmax calculated in step ST7 described above. Thus, setting the command torque Tm2 of the second motor-generator MG2 allows setting the torque output to the ring gear shaft 3e as a torque limited within the range of the input/output limits Win and Wout of the battery 24.

After the target rotation speed Ne and the target torque Te of the engine 2 and the respective command torques Tm1 and Tm2 of the motor-generators MG1 and MG2 are set as described above, the process proceeds to step ST10. The target rotation speed Ne and the target torque Te of the engine 2 are transmitted to the engine ECU 11 and the respective command torques Tm1 and Tm2 of the motor-generators MG1 and MG2 are transmitted to the motor ECU 13, so as to execute controls for these engine 2 and respective motor-generators MG1 and MG2. That is, when the engine ECU 11 has received the target rotation speed Ne and the target torque Te, the engine ECU 11 executes engine controls (such as a fuel injection control, an ignition control, and an intake air amount adjustment control) for obtaining the target rotation speed Ne and the target torque Te. The motor ECU 13 that has received the command torques Tm1 and Tm2 performs a switching control on switching elements of the inverters 21 and 22 such that the command torque Tm1 is used to drive the first motor-generator MG1 and the command torque Tm2 is used to drive the second motor-generator MG2.

The above-described operation is repeated. Accordingly, in the hybrid vehicle 1, when the S position is selected as the shift position SP (when the manual gear shift mode is selected), the required torque Tr and the target driving operation point (the target rotation speed Ne and the target torque Te) of the engine 2 are set based on the shift position SP (1st to 6th). Subsequently, the engine 2 and the respective motor-generators MG1 and MG2 are controlled such that the torque based on the required torque Tr is output to the ring gear shaft 3e. This allows responsively dealing with acceleration and deceleration requests from the driver.

—Gear-Shift Instruction Device—

In the hybrid vehicle 1 according to this embodiment, a gear-shift instruction device that performs a gear shift instruction (gear shift guide) in the manual gear shift mode (S mode) is mounted. The gear shift instruction prompts gear shifting to the driver. This gear-shift instruction device will be described below.

Figure 8:
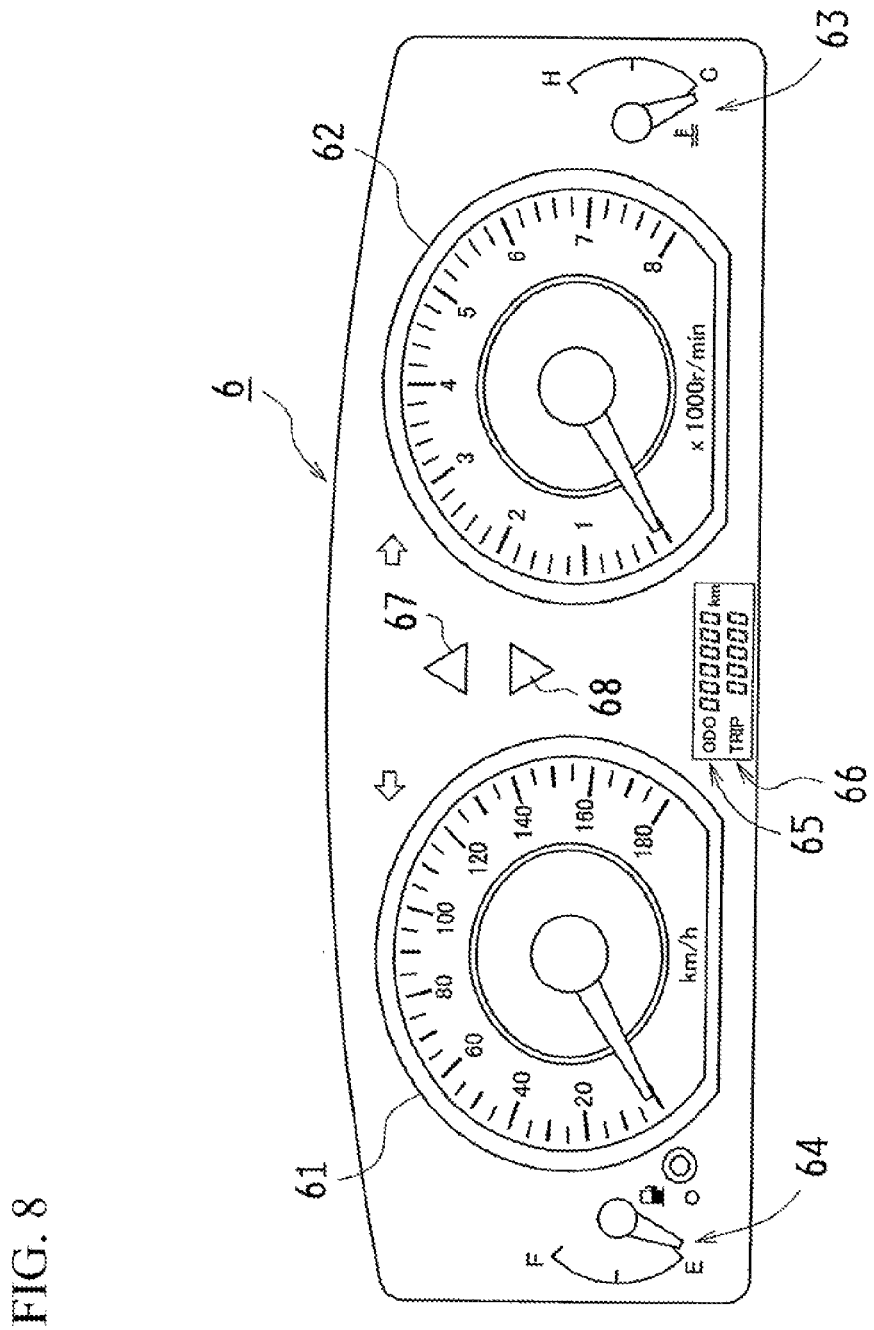
FIG. 8 is a diagram illustrating a combination meter mounted on the hybrid vehicle.

As illustrated in FIG. 8, in a combination meter 6 arranged in front of the driver's seat in the vehicle cabin, a speedometer 61, a tachometer 62, a water temperature gauge 63, a fuel gauge 64, an odometer 65, a trip meter 66, various warning indicator lamps, and similar member are arranged.

In this combination meter 6, a gear-shift instruction device is disposed for instructing selection of an appropriate gear shift position (gear position) to ensure improvement in fuel consumption corresponding to the running state of the hybrid vehicle 1 and similar effect. This gear-shift instruction device will be described below.

In the combination meter 6, as displaying portions for gear shift instruction, a shift-up lamp 67 and a shift-down lamp 68 are arranged. The shift-up lamp 67 is turned on during instruction of up-shifting the gear shift position. The shift-down lamp 68 is turned on during instruction of down-shifting the gear shift position. These shift-up lamp 67 and shift-down lamp 68 are constituted of for example, LEDs and controlled to be turned on and off by the GSI-ECU 16 (see FIG. 1). These shift-up lamp 67, shift-down lamp 68, and GSI-ECU 16 constitute a gear-shift instruction unit according to the present invention. Here, as a possible configuration, the GSI-ECU 16 may be excluded, and the above-described engine ECU 11 or a power management ECU (not illustrated) may control turning on and off the shift-up lamp 67 and the shift-down lamp 68.

—Shift Instruction Control during S Mode—

Firstly, in the hybrid vehicle 1 of this example, as described above, HV running in which running is performed in a state where the engine 2 is driven and EV running in which running is performed only with the power of the second motor-generator MG2 are used for different occasions. Here, in the conventional gear shift instruction control, the gear shift guide during EV running (the shift instruction by the above-described gear-shift instruction device) is not particularly considered. Accordingly, for example, during EV running, although the engine 2 is stopped, a gear shift guide focusing on the fuel consumption similarly to during HV running may be performed. Under this situation, the driver may feel a burden.

Taking into consideration this point, this embodiment reduces occasions of the gear shift guide (displays of the shift instruction) during EV running in the S mode compared with during HV running, so as to reduce the burden felt by the driver. A description will be given of one example of a specific control (a shift instruction control during the S mode) for realizing this effect with reference to a flowchart in FIG. 10.

Figure 10:
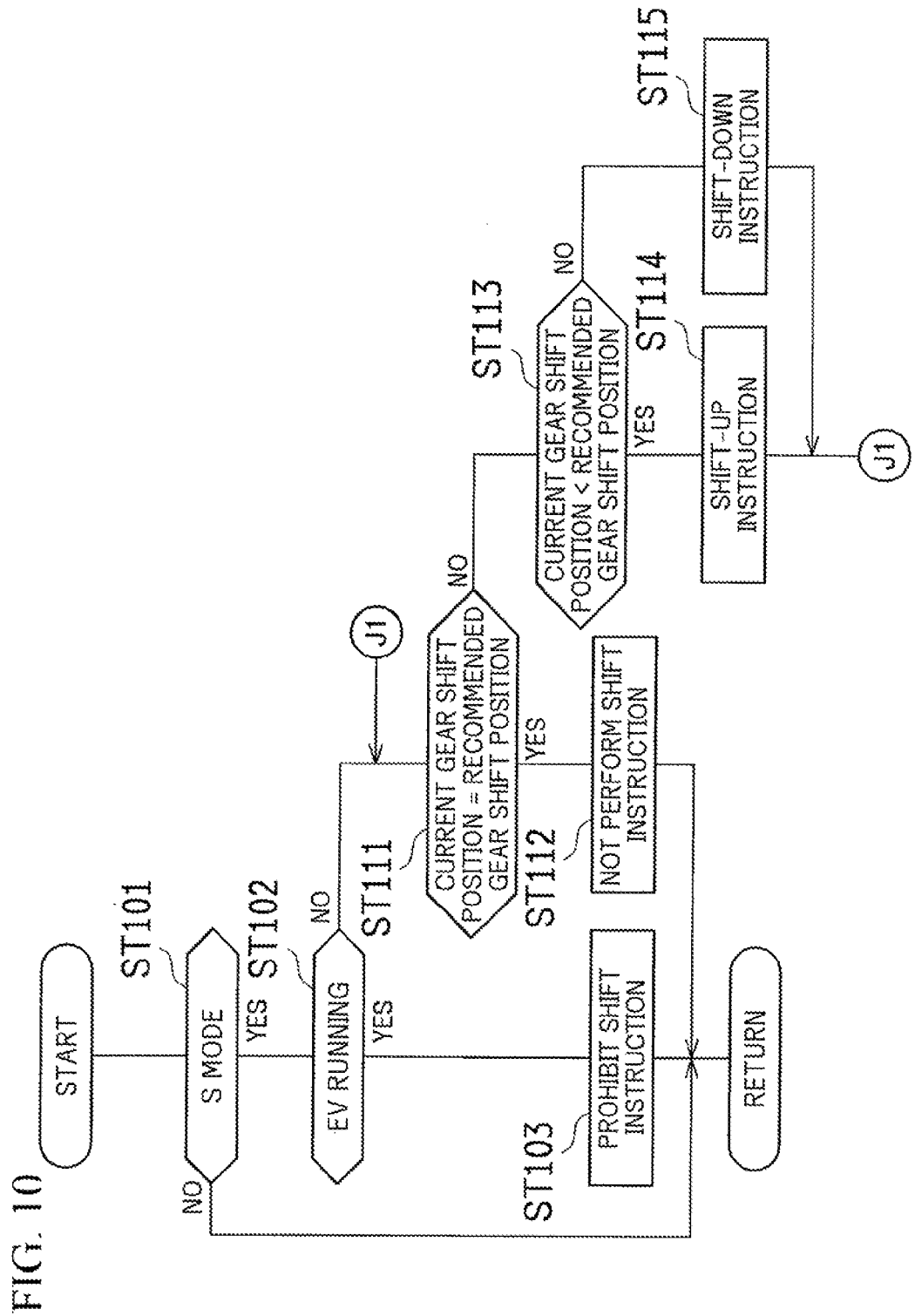
FIG. 10 is a flowchart illustrating one example of a shift instruction control during an S mode.

The control routine in FIG. 10 is repeatedly executed at a predetermined time interval (for example, every several msec) in the hybrid ECU 10.

Figure 11:
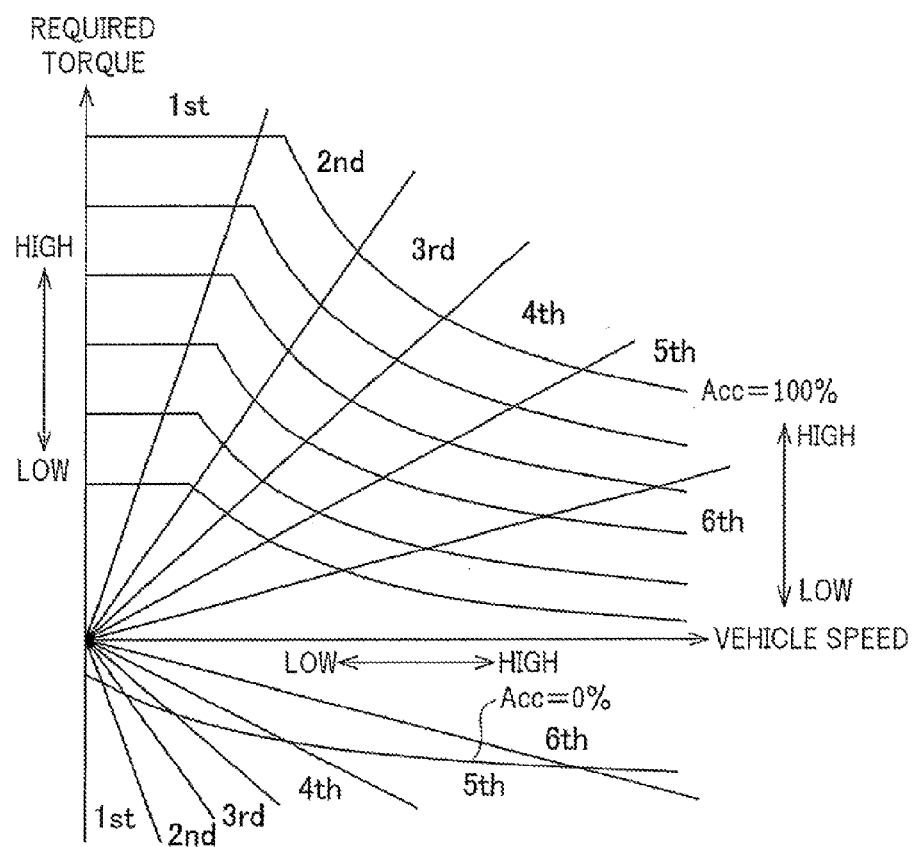
FIG. 11 is a graph illustrating one example of a shift line map.

Prior to the description of the shift instruction control during the S mode in FIG. 10, a shift line map used for this control will be described with reference to FIG. 11. This shift line map in FIG. 11 is a map in which the required torque, the vehicle speed V, and the accelerator position Acc are used as parameters and a plurality of regions (regions from a first gear shift position (1st) to a sixth gear shift position (6th) partitioned by gear-shift switching lines) are set for obtaining an appropriate gear shift position (a recommended gear shift position with the optimal fuel consumption) corresponding to those required torque, and vehicle speed V, and accelerator position Acc. The shift line map is stored in the ROM 41 of the hybrid ECU 10.

Next, the shift instruction control during the S mode in FIG. 10 will be described.

When the control routine in FIG. 10 is started, firstly, in step ST101, it is determined whether or not the S mode (the manual gear shift mode) is selected based on the output signal of the shift position sensor 50. In the case where the determination result is a negative determination (NO), the process returns. In the case where the determination result in step ST101 is an affirmative determination (YES), the process proceeds to step ST102.

In step ST102, it is determined whether or not the current running state of the hybrid vehicle 1 is "EV running" In the case where the determination result in this step ST102 is a negative determination (NO), that is, in the case where the running state is "HV running" while the engine 2 is driven, the process proceeds to step ST111. Here, the determination of "EV running" is made based on, for example, the instruction signal transmitted from the hybrid ECU 10 to the motor ECU 13.

In step ST111, the current vehicle speed V is obtained from the output signal of the vehicle speed sensor 54. Additionally, the current accelerator position Acc is obtained from the output signal of the accelerator position sensor 52. These vehicle speed V and accelerator position Acc are used to obtain the required torque Tr with reference to the required-torque setting map illustrated in FIG. 4. Based on this required torque Tr and the above-described vehicle speed V or accelerator Acc, the recommended gear shift position (target gear shift position) is obtained with reference to the shift line map illustrated in FIG. 11. Subsequently, the recommended gear shift position and the current gear shift position are compared with each other so as to determine whether or not the recommended gear shift position and the current gear shift position are the same. In the case where the determination result is an affirmative determination (YES) (in the case of [the current gear shift position=the recommended gear shift position]), the shift-up instruction by the gear-shift instruction device is not performed (in step ST112).

Here, the current gear shift position can be recognized by a calculated gear shift ratio. For example, this gear shift ratio is calculated as a ratio (gear shift ratio) between the rotation speed (engine rotation speed) of the input shaft (the planetary carrier 3*d*) of the power split mechanism 3 and the rotation speed of the ring gear shaft 3*e* (recognized by the output signal of the vehicle speed sensor 54 or the output-shaft rotation speed). Alternatively, based on the output signal of the shift position sensor 50, the current gear shift position can be recognized by the gear shift position set when the shift lever 91 is operated to the S position, the number of operations to the "+" or "−" position in the S position, and similar information.

In the case where the determination result in step ST111 described above is a negative determination (NO) (in the case where the recommended gear shift position and the current gear shift position are different from each other), the process proceeds to step ST113. In step ST113, it is determined whether or not the current gear shift position is a lower gear shift position than the recommended gear shift position (the current gear shift position<the recommended gear shift position). In the case where the determination result is an affirmative determination (YES), the process proceeds to step ST114.

Figure 9A:
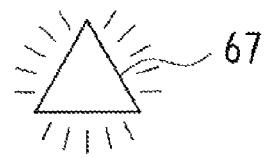
FIG. 9A is a diagram illustrating a state of a shift-up instruction.
Figure 9A:

In step ST114, a control signal for issuing an shift-up command is transmitted from the hybrid ECU 10 to the GSI-ECU 16, and the shift-up lamp 67 is turned on (see FIG. 9A). This turning on of the shift-up lamp 67 (shift-up instruction) continues until the determination result in step ST111 becomes an affirmative determination (YES). Subsequently, when the driver operates the shift lever 91 to the "+" position or operates the shift-up paddle switch 9c in response to this shift-up instruction (gear shift guide) by turning on the shift-up lamp 67, an shift-up operation is performed in the hybrid system. At the time point when the current gear shift position and the recommended gear shift position coincide with each other by this shift-up operation (at the time point when the determination result in step ST111 becomes an affirmative determination (YES)), the shift-up lamp 67 is turned off and the shift instruction by the above-described gear-shift instruction device is not performed (in step ST112).

In the case where the determination results in step ST111 and step ST113 described above are both negative determinations (NO), that is, in the case where the current gear shift position is a higher gear shift position than the recommended gear shift position (the current gear shift position>the recommended gear shift position), the process proceeds to step ST115.

Figure 9B:
FIG. 9B is a diagram illustrating a state of a shift-down instruction.
Figure 9B:
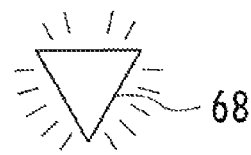

In step ST115, a control signal for issuing a down-shift command is transmitted from the hybrid ECU 10 to the GSI-ECU 16, and the shift-down lamp 68 is turned on (see FIG. 9B). This turning on of the shift-down lamp 68 (shift-down instruction) continues until the determination result in step ST111 becomes an affirmative determination (YES). Subsequently, when the driver operates the shift lever 91 to the "−" position or operates the shift-down paddle switch 9d in response to this shift-down instruction (gear shift guide) by turning on the shift-down lamp 68, a shift-down operation is performed in the hybrid system. At the time point when the current gear shift position and the recommended gear shift position coincide with each other by this shift-down operation (at the time point when the determination result in step ST111 becomes an affirmative determination (YES)), the shift-down lamp 68 is turned off and the shift instruction by the above-described gear-shift instruction device is not performed (in step ST112).

On the other hand, in the case where the determination result in step ST102 described above is an affirmative determination (YES), that is, in the case where the current running state of the hybrid vehicle 1 is "EV running", the shift instruction by the above-described gear-shift instruction device is prohibited so as not to perform the gear shift guide (in step ST103).

As described above, with this embodiment, in the S mode, the modes of the guide for gear shift (gear shift instruction) are different between during HV running and during EV running (in the S mode, the modes of the guide for gear shift are different between during EV running and during HV running for the same accelerator depression amount and vehicle speed). Accordingly, during EV running, the gear shift guide is not performed (the shift instruction is not displayed). This reduces situations where, for example, a gear shift guide focusing on the fuel consumption similarly to during HV running is performed although the engine 2 is stopped during EV running, so as to reduce the burden felt by the driver during EV running. Moreover, during HV running (during engine operation), this allows accurately issuing a shift instruction (gear shift guide) for prompting appropriate gear shift to the recommended gear shift position, thus ensuring the improvement of the fuel consumption rate of the engine 2.

(Modification 1-1)

Figure 12:
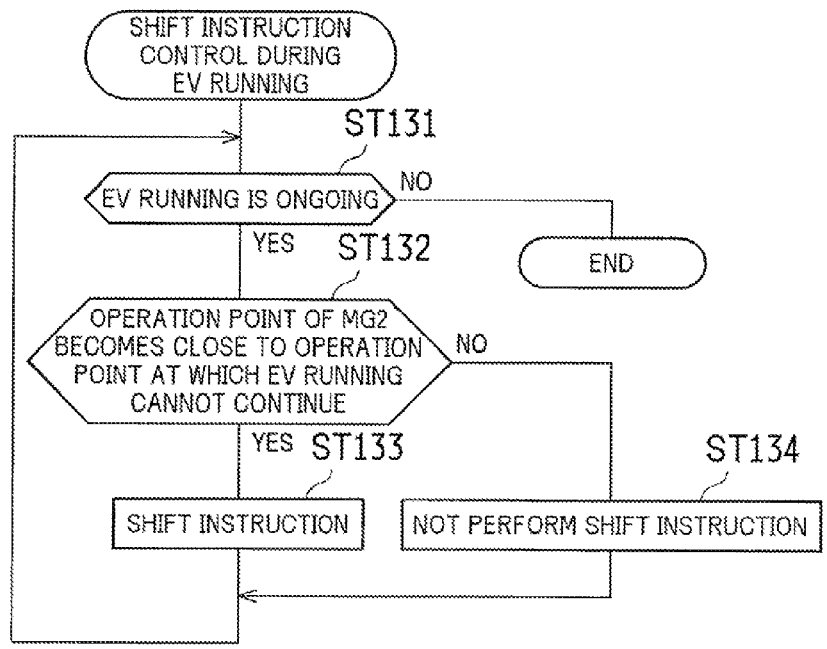
FIG. 12 is a flowchart illustrating one example of a shift instruction control during EV running

Instead of the above-described process in step ST103 (prohibition of the shift instruction) of the flowchart in FIG. 10, a subroutine illustrated in FIG. 12 (a shift instruction control during EV running) may be executed. This control routine in FIG. 12 will be described. Here, the control routine in FIG. 12 can be executed in the hybrid ECU 10.

When the control routine in FIG. 12 is started, firstly, it is determined whether or not EV running is ongoing in step ST131. In the case where the determination result is a negative determination (NO), the process of this subroutine is terminated and the process returns to the main routine in FIG. 10. In the case where the determination result in step ST131 is an affirmative determination (YES), the process proceeds to step ST132.

In step ST132, it is determined whether or not the operation point of the second motor-generator MG2 becomes close to the operation point at which EV running cannot continue.

Figure 13:
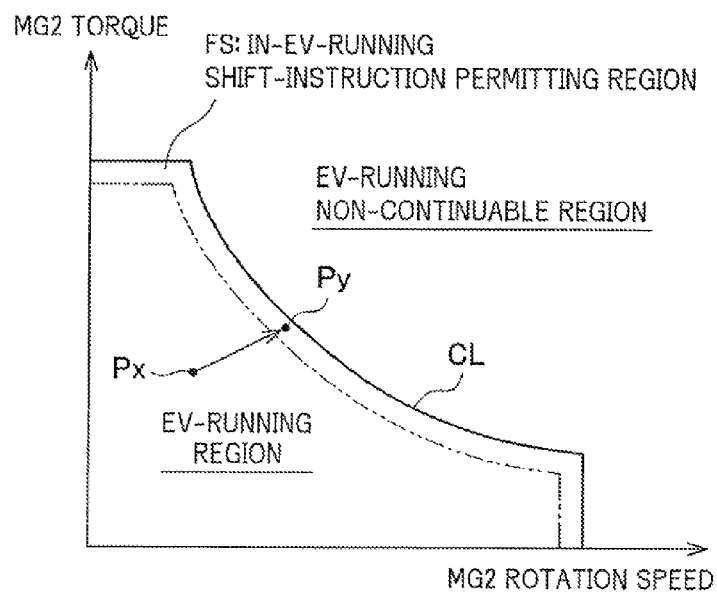
FIG. 13 is a graph illustrating one example of a map used for the shift instruction control during EV running.

Specifically, based on an in-EV-running indication-permission determination map (described in detail below) illustrated in FIG. 13, it is determined whether or not the operation point of the second motor-generator MG2 becomes inside of an in-EV-running shift-instruction permitting region. For example, as illustrated in FIG. 13, in the case where the operation point of the second motor-generator MG2 transitions from an operation point Px to an operation point Py and then becomes inside of the in-EV-running shift-instruction permitting region, it is determined that "the operation point of the second motor-generator MG2 becomes close to an operation point at which EV running cannot continue." Subsequently, the process proceeds to step ST133. In the case where the determination result in step ST132 is a negative determination (NO) (in the case where EV running can continue), a shift-up instruction by the above-described gear-shift instruction device is not performed (in step ST134) and the process returns to step ST131.

In step ST133, the shift instruction is performed. Specifically, a process similar to step ST111 to step ST115 in the above-described flowchart of FIG. 10 is executed. That is, in the case where a recommended gear shift position (target gear shift position) is obtained with reference to the shift line map illustrated in FIG. 11 and then the recommended gear shift position and the current gear shift position coincide with each other, the shift instruction by the above-described gear-shift instruction device is not performed. Here, this non-performance of the shift instruction is also included in the gear shift guide. On the other hand, in the case where the current gear shift position is a lower gear shift position than the recommended gear shift position (the current gear shift position<the recommended gear shift position), the shift-up lamp 67 is turned on to issue a shift-up instruction. In the case where the current gear shift position is a higher gear shift position than the recommended gear shift position (the current gear shift position>the recommended gear shift position), the shift-down lamp 68 is turned on to issue a shift-down instruction.

This process in steps ST132 to ST134 is repeatedly executed while EV running continues. Subsequently, in the case where the running state of the hybrid vehicle 1 has changed from EV running (in the case where the determination result in step ST131 becomes a negative determination (NO)), this subroutine is terminated and the process returns to the main routine in FIG. 10.

As described above, with this modification, during EV running in the S mode, the gear shift guide (gear shift instruction) is performed only in the case where the operation point of the second motor-generator MG2 becomes close to the operation point (a boundary line CL) at which EV running cannot continue. This allows reducing occasions of the gear shift guide during EV running compared with during HV running. This allows reducing the burden felt by the driver during EV running.

(In-EV-Running Indication-Permission Determination Map)

The map illustrated in FIG. 13 sets a boundary line (motor characteristic line) CL partitioning a region into an EV-running region and an EV-running non-continuable region (a region in which EV running cannot continue) by the second motor-generator MG2 and a strip-shaped in-EV-running shift-instruction permitting region Fs inside the boundary line CL (on a low-torque low-rotation side). This in-EV-running shift-instruction permitting region Fs is a region to determine that the operation point of the second motor-generator MG2 becomes close to the boundary line CL (the boundary line with the region in which EV running cannot continue) to a predetermined degree (the degree that a transition from EV running to HV running is predicted), and is adapted by experiments, calculations, and similar information. Here, the map in FIG. 13 is stored in the ROM 41 of the hybrid ECU 10.

Embodiment 2

Figure 14:
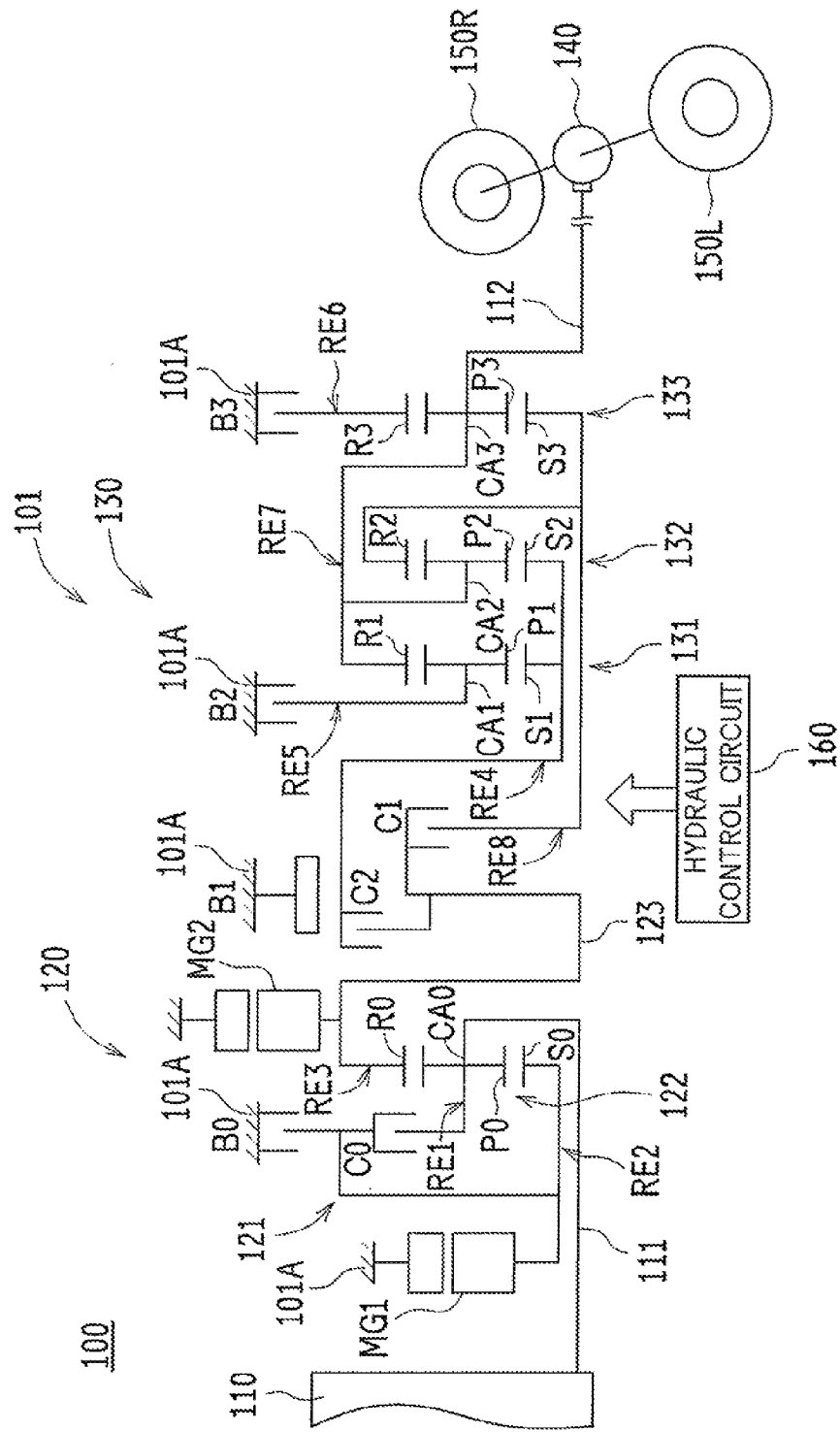
FIG. 14 is a schematic configuration diagram illustrating another example of the hybrid vehicle to which the present invention is applied.

FIG. 14 is a schematic configuration diagram illustrating another example of the hybrid vehicle to which the present invention is applied.

A hybrid vehicle 100 in this example is a front-engine rear-drive (FR) hybrid vehicle on which a driving device 101 is mounted. A part of (an electrical differential unit 120, a mechanical gear shifting unit 130, and similar member) of the configuration of the driving device 101 corresponds to the "gear shifting unit" according to the present invention.

The driving device 101 includes an engine 110 that generates a driving force for vehicle running, the electrical differential unit 120, the mechanical gear shifting unit 130, and similar member. The driving device 101 transmits power from the engine 110 to right and left drive wheels (rear wheels) 150L and 150R via a damper (not illustrated), an input shaft 111, the electrical differential unit 120, the mechanical gear shifting unit 130, an output shaft 112, and a differential device 140. These crankshaft of the engine 110, electrical differential unit 120, mechanical gear shifting unit 130, and similar member constitute a driving power transmission system according to the present invention.

Figure 15:
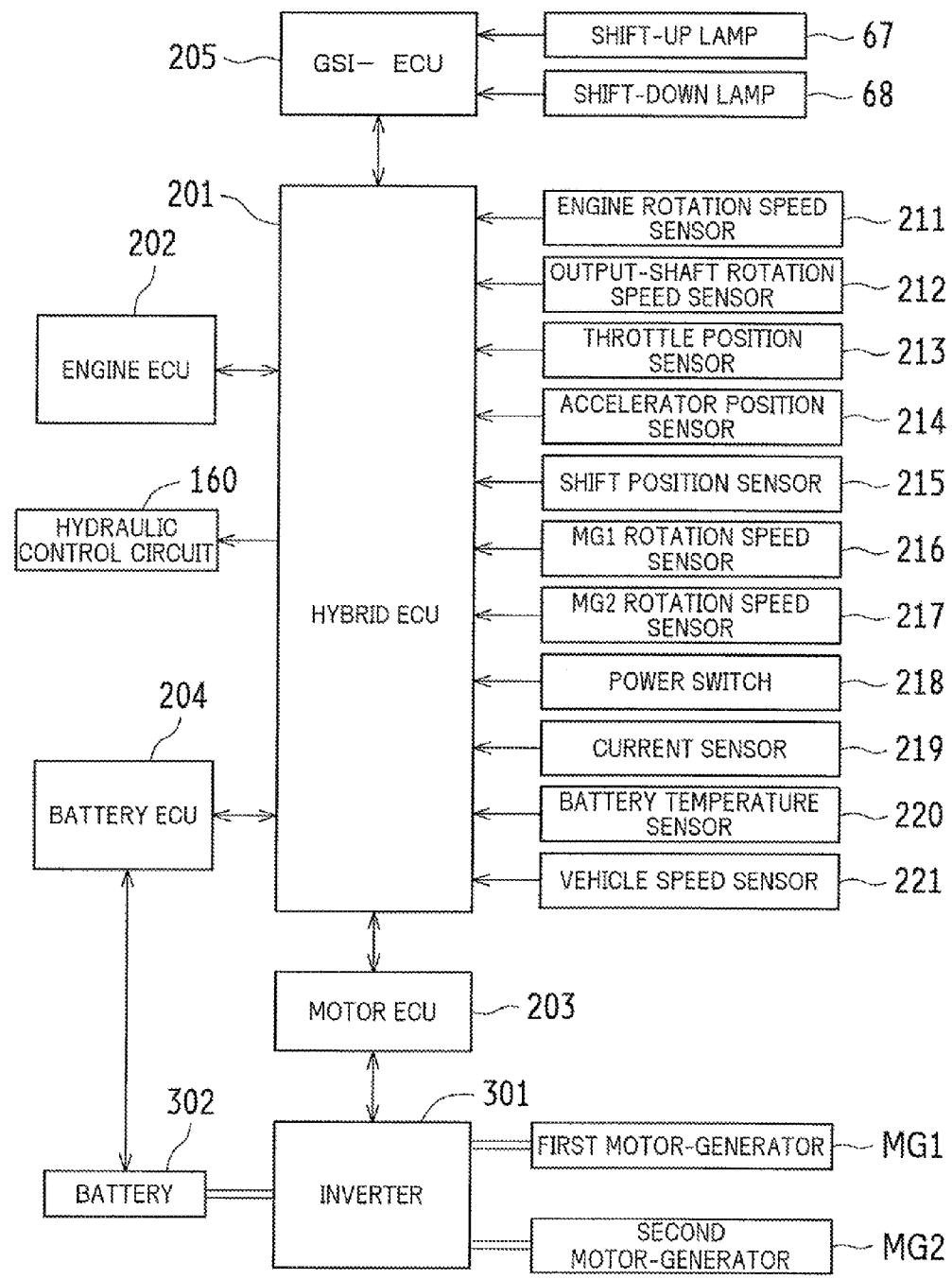
FIG. 15 is a block diagram illustrating a schematic configuration of a control system of the hybrid vehicle in FIG. 14.

As illustrated in FIG. 15, the hybrid vehicle 100 includes, as a control system, a hybrid ECU 201, an engine ECU 202, a motor ECU 203, a battery ECU 204, a GSI-ECU 205, and similar member. These hybrid ECU 201, engine ECU 202, motor ECU 203, battery ECU 204, and GSI-ECU 205 are communicatively coupled to one another.

Here, the electrical differential unit 120 and the mechanical gear shifting unit 130 described above have configurations that are approximately symmetrical with respect to the shaft center. Thus, the lower halves of these members are omitted in FIG. 14.

Next, a description will be given below of the respective portions of the engine 110, the motor-generators MG1 and MG2, the electrical differential unit 120, the mechanical gear shifting unit 130, and the ECUs 201 to 205, and similar member.

—Engine—

The engine 110 in this example is also a known power unit (internal combustion engine), for example, a gasoline engine or a diesel engine that outputs power by burning a fuel. The engine 110 is configured to control operating states such as a throttle position (intake air amount) of a throttle valve disposed at an intake passage, a fuel injection amount, ignition timing, and similar state. Exhaust gas after burning passes through an exhaust passage (not illustrated), purified by an oxidation catalyst (not illustrated), and then discharged to the outside air.

—Electrical Differential Unit—

The electrical differential unit 120 includes a first motor-generator MG1, a power split mechanism 121, and a second motor-generator MG2. The power split mechanism 121 is a mechanical mechanism that mechanically distributes/combines the output of engine 110 input to the input shaft 111. The power split mechanism 121 distributes the output of the engine 110 to the first motor-generator MG1 and a transmission shaft 123 or combines the output of the engine 110 and the output of the first motor-generator MG1 so as to output the combined result to the transmission shaft 123. The second motor-generator MG2 is disposed to rotate integrally with the transmission shaft 123.

(Motor-Generator)

The first motor-generator MG1 is an AC synchronous generator that includes a rotor (rotating element) that is made of a permanent magnet and rotatably supported on the input shaft 111 and a stator (stator element) around which three-phase windings are wound. The first motor-generator MG1 functions as an electric generator (generator) and also functions as an electric motor (electrically-driven motor). Similarly, the second motor-generator MG2 is an AC synchronous generator that includes a rotor (rotating element) that is made of a permanent magnet and a stator (stator element) around which three-phase windings are wound. The second motor-generator MG2 functions as an electric motor (electrically-driven motor) and also functions as an electric generator (generator).

At these first motor-generator MG1 and second motor-generator MG2, respective MG1 rotation speed sensor (resolver) 216 and MG2 rotation speed sensor (resolver) 217 for detecting rotation angles of the respective rotors (rotating shafts) (see FIG. 15) are disposed. The respective output signals of these rotation speed sensors 107 and 108 (rotation-angle detection values) are input to the hybrid ECU 201 and used for respective driving controls of the motor-generators MG1 and MG2.

As illustrated in FIG. 15, the first motor-generator MG1 and the second motor-generator MG2 are each coupled to a battery (electric storage device) 302 via an inverter 301. The inverter 301 is controlled by the motor ECU 203.

The inverter 301 includes respective intelligent power modules (IPMs) for controlling the respective motor-generators MG1 and MG2. The IPMs are each constituted of a plurality of (for example, six) semiconductor switching elements (for example, insulated gate bipolar transistors (IGBTs)) and similar member.

The motor ECU 203 controls the inverter 301 corresponding to an output request from the hybrid ECU 201 so as to control power running or regeneration of the respective motor-generators MG1 and MG2. Specifically, for example, the motor ECU 203 causes conversion of a direct current from the battery 302 into an alternating current for driving the motor-generators MG1 and MG2 while causing conversion of an alternating current generated by the first motor-generator MG1 due to power of the engine 1 and an alternating current generated by the second motor-generator MG2 due to regenerative braking into a direct current for charging the battery 302. Additionally, the motor ECU 203 causes supply of an alternating current generated by the first motor-generator MG1 as electric power for driving the second motor-generator MG2 corresponding to the running state.

(Power Split Mechanism)

The power split mechanism 121 includes a planetary gear mechanism 122 of a single pinion type with a predetermined gear ratio ρ0, a switching clutch C0, and a switching brake B0. The planetary gear mechanism 122 includes a sun gear S0, a plurality of pinion gears P0, a planetary carrier CA0, and a ring gear R0 as rotational elements. The planetary carrier CA0 supports these plurality of pinion gears P0 to allow rotation and revolution of the plurality of pinion gears P0. The ring gear R0 meshes with the sun gear S0 via the pinion gear P0. Assuming that the number of teeth of the sun gear S0 is ZS0 and the number of teeth of the ring gear R0 is ZR0, the above-described gear ratio ρ0 is ZS0/ZR0.

In this power split mechanism 121, the planetary carrier CA0 is coupled to the input shaft 111, that is, the crankshaft of the engine 110 while the sun gear S0 is coupled to the rotor (rotating shaft) of the first motor-generator MG1. The ring gear R0 is coupled to the transmission shaft 123.

The switching brake B0 is disposed between the sun gear S0 and a transmission case 101A. The switching clutch C0 is disposed between the sun gear S0 and the planetary carrier CA0.

Releasing these switching clutch C0 and switching brake B0 provides a differential state in which a differential action operates to allow relative rotations of the respective sun gear S0, planetary carrier CA0, and ring gear R0 with respect to one another. Accordingly, the output of the engine 110 is distributed to the first motor-generator MG1 and the transmission shaft 123. Additionally, a part of the distributed output of the engine 110 causes the first motor-generator MG1 to generate electric energy, so as to charge the battery 302 illustrated in FIG. 15. The electric energy generated from the first motor-generator MG1 causes the second motor-generator MG2 to be rotatably driven. Thus, for example, a continuously-variable shifting state is set such that the rotation of the transmission shaft 123 is continuously varied regardless of the rotation speed of the engine 110. That is, the electrical differential unit 120 is in the differential state in which a gear shift ratio γ0 (the rotation speed of the input shaft 111/the rotation speed of the transmission shaft 123) is electrically varied from the minimum value γ0min to the maximum value γ0max, for example, so as to function as an electrical continuously variable transmission in which the gear shift ratio γ0 is continuously varied from the minimum value γ0min to the maximum value γ0max.

On the other hand, when the switching clutch C0 is engaged and then the sun gear S0 and the planetary carrier CA0 integrally engage each other, three elements that constitute the planetary gear mechanism 122, that is, the sun gear S0, the planetary carrier CA0, and the ring gear R0 become a non-differential state that causes integral rotation of these elements. The rotation speed Ne of the engine 110 and the rotation speed of the transmission shaft 123 coincide with each other in this state. Accordingly, the electrical differential unit 120 becomes a fixed shifting state (step-variable shifting state) to function as a transmission in which the gear shift ratio γ0 is fixed to "1."

When the switching brake B0 is engaged instead of the switching clutch C0, the sun gear S0 becomes a non-rotating state (non-differential state) and the ring gear R0 rotates at a speed higher than that of the planetary carrier CA0. Accordingly, the electrical differential unit 120 becomes the fixed shifting state (step-variable transmission) to function as a speed-increasing transmission in which the gear shift ratio γ0 is fixed to a value smaller than "1."

As described above, in this example, the switching clutch C0 and the switching brake B0 function as a differential-state switching device that selectively switches the electrical differential unit 120 between the continuously-variable shifting state and the fixed shifting state. In the continuously-variable shifting state, the electrical differential unit 120 operates as an electrical continuously variable transmission that can continuously varies the gear shift ratio. In a state where the electrical differential unit 120 does not operate as a continuously variable transmission and the variation of the gear shift ratio is locked, that is, in the fixed shifting state, the electrical differential unit 120 can operate as a single-stage or multi-stage transmission with one type or two types of gear shift ratios. Here, switching between the continuously-variable shifting state and the step-variable shifting state is controlled by the hybrid ECU 201 based on the vehicle condition, the operating state of the engine 110, and similar parameter.

In the case where the switching clutch C0 and the switching brake B0 are both released and the first motor-generator MG1 becomes a freely rotatable state in which a reactive force is not generated, the above-described electrical differential unit 120 becomes a power interrupting state in which power transmission on a power transmission path within the electrical differential unit 120 is interrupted. On the other hand, in the case where the first motor-generator MG1 generates a reactive force or any one of the switching clutch C0 and the switching brake B0 is engaged, the electrical differential unit 120 becomes a power transmitting state that allows power transmission on the power transmission path within the electrical differential unit 120.

Subsequently, setting the electrical differential unit 120 to the power interrupting state or the power transmitting state makes the entire the driving device 101 to be in the power interrupting state or the power transmitting state. However, in this example, the power transmission path between the second motor-generator MG2 and the drive wheels 150L and 150R is not interrupted. Accordingly, to make the entire driving device 101 to be in the power interrupting state, the second motor-generator MG2 is put into the freely rotatable state.

The switching clutch C0 and the switching brake B0 described above are hydraulic friction engagement devices frequently used in a conventional vehicular step-variable type automatic transmission. One example of the frictional engagement devices includes a wet multi-disc type engagement device having a plurality of superposed friction plates pressed against each other with a hydraulic actuator. Another example includes a band brake type engagement device with a rotary drum having an outer circumferential surface wounded with one band or two bands to be tightened at one ends with a hydraulic actuator to allow associated component parts, between which the rotary drum intervenes, to be selectively connectable to each other.

—Mechanical Gear Shifting Unit—

The mechanical gear shifting unit 130 is a step-variable type automatic transmission with five forward gears and one reverse gear. As illustrated in FIG. 14, the mechanical gear shifting unit 130 includes a first planetary gear mechanism 131 of a single pinion type, a second planetary gear mechanism 132 of a single pinion type, and a third planetary gear mechanism 133 of a single pinion type.

The first planetary gear mechanism 131 includes a first sun gear S1, a first pinion gear P1, a first planetary carrier CA1, which supports the first pinion gear P1 to allow rotation and revolution of the first pinion gear P1, and a first ring gear R1, which meshes with the first sun gear S1 via the first pinion gear P1. The first planetary gear mechanism 131 has a predetermined gear ratio ρ1.

The second planetary gear mechanism 132 includes a second sun gear S2, a second pinion gear P2, a second planetary carrier CA2, which supports the second pinion gear P2 to allow rotation and revolution of the second pinion gear P2, and a second ring gear R2, which meshes with the second sun gear S2 via the second pinion gear P2. The second planetary gear mechanism 132 has a predetermined gear ratio ρ2.

The third planetary gear mechanism 133 includes a third sun gear S3, a third planetary gear P3, a third planetary carrier CA3, which supports the third planetary gear P3 to allow rotation and revolution of the third planetary gear P3, and a third ring gear R3, which meshes with the third sun gear S3 via the third planetary gear P3. The third planetary gear mechanism 133 has a predetermined gear ratio ρ3.

Assume that the number of teeth of the first sun gear S1 is ZS1, the number of teeth of the first ring gear R1 is ZR1, the number of teeth of the second sun gear S2 is ZS2, the number of teeth of the second ring gear R2 is ZR2, the number of teeth of the third sun gear S3 is ZS3, and the number of teeth of the third ring gear R3 is ZR3. The gear ratio ρ1 is ZS1/ZR1, the gear ratio ρ2 is ZS2/ZR2, and the gear ratio ρ3 is ZS3/ZR3.

In the mechanical gear shifting unit 130 of this example, the first sun gear S1 and the second sun gear S2 are integrally coupled to each another so as to be selectively coupled to the transmission shaft 123 via the second clutch C2 and selectively coupled to the transmission case 101A via the first brake B1. The first planetary carrier CA1 is selectively coupled to the transmission case 101A via a second brake B2. The third ring gear R3 is selectively coupled to the transmission case 101A via a third brake B3. Furthermore, the first ring gear R1, the second planetary carrier CA2, and the third planetary carrier CA3 are integrally coupled to one another and are coupled to the output shaft 112. The second ring gear R2 and the third sun gear S3 are integrally coupled to each other and are selectively coupled to the transmission shaft 123 via a first clutch C1.

The switching clutch C0, the first clutch C1, the second clutch C2, the switching brake B0, the first brake B1, the second brake B2, and the third brake B3 are hydraulic friction engagement elements frequently used in a conventional vehicular automatic transmission. One example of the frictional engagement devices includes a wet multi-disc type engagement device having a plurality of superposed friction plates pressed against each other with a hydraulic actuator. Another example includes a band brake type engagement device with a rotary drum having an outer circumferential surface wounded with one band or two bands to be tightened at one ends with a hydraulic actuator to allow associated component parts, between which the rotary drum intervenes, to be selectively connectable to each other.

In the driving device 101 thus configured, for example, as illustrated in an engagement operation table in FIG. 16, engagement operations of the switching clutch C0, the first clutch C1, the second clutch C2, the switching brake B0, the first brake B1, the second brake B2, and the third brake B3 are selectively performed. Accordingly, any one gear shift position of the first gear shift position (1st) to the fifth gear shift position (5th) is selectively satisfied. Additionally, the reverse gear shift position or neutral is selectively satisfied. This allows obtaining a gear shift ratio γ (γ=the input-shaft rotation speed Nin/the output-shaft rotation speed Nout) that varies by the approximately equal ratio for each gear shift position.

Especially, in this example, the switching clutch C0 and the switching brake B0 are disposed at the electrical differential unit 120. Engaging any one of these switching clutch C0 and switching brake B0 allows the electrical differential unit 120 to constitute the above-described continuously-variable shifting state, which allows operation as a continuously variable transmission, and to further constitute the fixed shifting state, which allows operation as a transmission with a constant gear shift ratio. Accordingly, in the driving device 101 of this example, engaging any one of the switching clutch C0 and the switching brake B0 constitute a step-variable transmission by the electrical differential unit 120 in the fixed shifting state and the mechanical gear shifting unit 130. Releasing both of the switching clutch C0 and the switching brake B0 constitutes a continuously variable transmission by the electrical differential unit 120 in the continuously-variable shifting state and the mechanical gear shifting unit 130.

For example, in the case where the driving device 101 functions as the step-variable transmission, as illustrated in FIG. 16, the respective engagements of the switching clutch C0, the first clutch C1, and the third brake B3 satisfy the first gear shift position (1st) in which a gear shift ratio γ1 has the maximum value and the respective engagements of the switching clutch C0, the first clutch C1, and the second brake B2 satisfy the second gear shift position (2nd) in which a gear shift ratio γ2 has a value smaller than that of the first gear shift position.

The respective engagements of the switching clutch C0, the first clutch C1, and the first brake B1 satisfy the third gear shift position (3rd) in which a gear shift ratio γ3 has a smaller value than that in the second gear shift position. The respective engagements of the switching clutch C0, the first clutch C1, and the second clutch C2 satisfy the fourth gear shift position (4th) in which a gear shift ratio γ4 has a smaller value (for example, "1.000") than that in the third gear shift position. Furthermore, the respective engagements of the first clutch C1, the second clutch C2, and the switching brake B0 satisfy the fifth gear shift position (5th) in which a gear shift ratio γ5 has a value smaller than that in the fourth gear shift position.

On the other hand, the respective engagements of the second clutch C2 and the third brake B3 satisfy a reverse gear shift position (R) in which a gear shift ratio γR has a value between those of the first gear shift position (1st) and the second gear shift position (2nd). Here, in case of the neutral "N" state, for example, the switching clutch C0 is engaged alone.

On the other hand, in the case where the driving device 101 functions as a continuously variable transmission, the switching clutch C0 and the switching brake B0 are both released. Accordingly, the electrical differential unit 120 functions as a continuously variable transmission while the mechanical gear shifting unit 130 coupled in series to this electrical differential unit 120 functions as a step-variable transmission. This steplessly changes the rotation speed input to the mechanical gear shifting unit 130, that is, the rotation speed of the transmission shaft 123 for each of the gear shift positions of the first gear shift position, the second gear shift position, the third gear shift position, and the fourth gear shift position in the mechanical gear shifting unit 130. Thus, each gear shift position has a stepless gear shift ratio range. This provides a gear shift ratio that can continuously change in a stepless manner between respective gear shift positions of the mechanical gear shifting unit 130, thus steplessly obtaining the total gear shift ratio μT of the driving device 101 as a whole.

Figure 17:
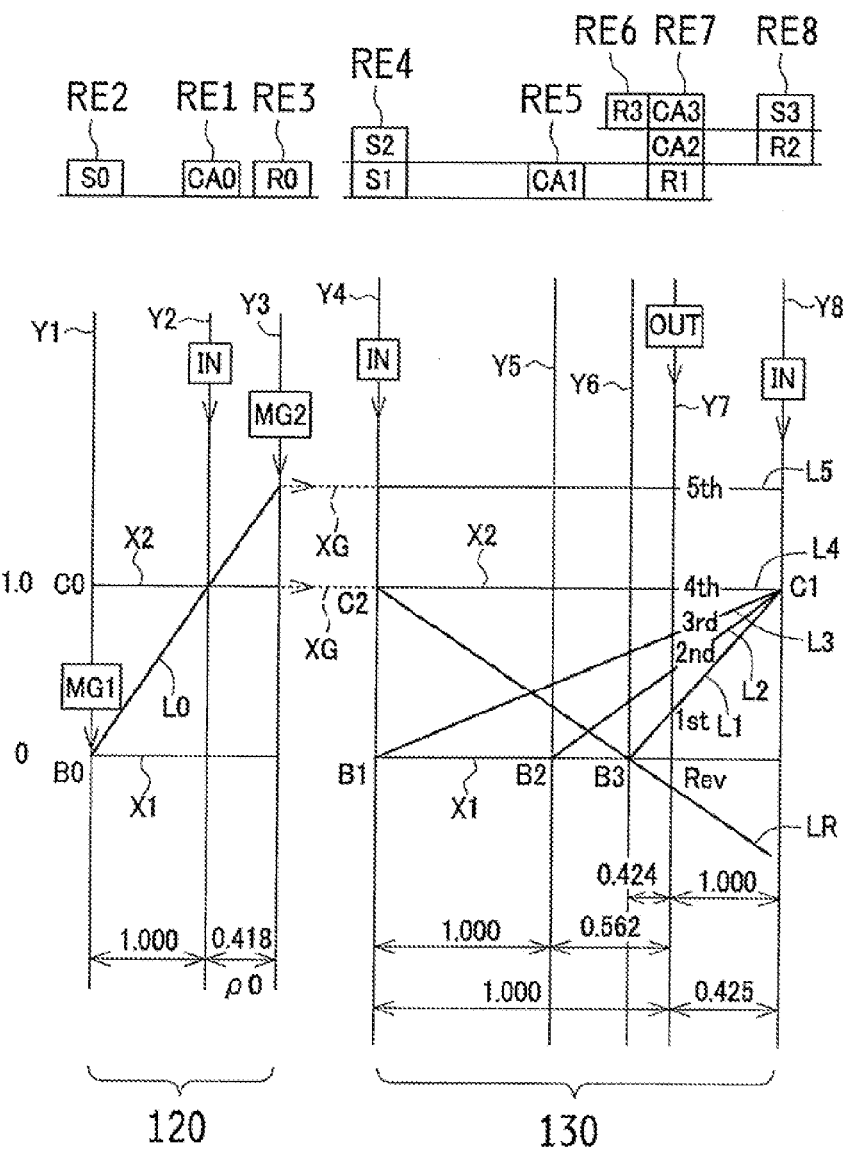
FIG. 17 is a collinear diagram for describing a relative rotation speed in each gear position in the case where the driving device mounted on the hybrid vehicle in FIG. 14 performs the step-variable shifting operation.

FIG. 17 illustrates a collinear diagram expressing a relative relationship of the rotation speed between the respective rotational elements in different coupling states for each gear shift position on a straight line in the driving device 101, which includes the electrical differential unit 120, which functions as a continuously-variable shifting unit or a first gear shifting unit and the mechanical gear shifting unit 130, which functions as a step-variable shifting unit or a second gear shifting unit.

The collinear diagram in FIG. 17 is in a two-dimensional coordinate system that illustrates a relative relationship of the gear ratio ρ between the respective planetary gear mechanisms 122, 131, 132, and 133 on the horizontal axis and that illustrates a relative rotation speed on the vertical axis. The lower horizontal line X1 among the three horizontal axes illustrates a rotation speed of "0." The upper horizontal line X2 illustrates a rotation speed of "1.0", that is, the engine rotation speed Ne of the engine 110 coupled to the input shaft 111. The horizontal axis XG illustrates the rotation speed of the transmission shaft 123.

Among the three vertical lines Y1, Y2, and Y3 corresponding to the three elements of the planetary gear mechanism 122 that constitutes the electrical differential unit 120, the vertical line Y1 expresses the sun gear S0 corresponding to a second rotational element (second element) RE2. The vertical line Y2 expresses the planetary carrier CA0 corresponding to a first rotational element (first element) RE1. The vertical line Y3 expresses the relative rotation speed of the ring gear R0 corresponding to a third rotational element (third element) RE3. The distances of these lines are determined corresponding to the gear ratio ρ0 of the planetary gear mechanism 122. That is, assuming that the distance between the vertical lines Y1 and Y2 corresponds to "1", the distance between the vertical lines Y2 and Y3 corresponds to the gear ratio ρ0.

Furthermore, among the five vertical lines of the vertical lines Y4, Y5, Y6, Y7, and Y8 of the mechanical gear shifting unit 130, the vertical line Y4 corresponds to a fourth rotational element (fourth element) RE4 and expresses the first sun gear S1 and the second sun gear S2 that are mutually coupled together. The vertical line Y5 expresses the first planetary carrier CA1 corresponding to a fifth rotational element (fifth element) RE5. The vertical line Y6 expresses the third ring gear R3 corresponding to a sixth rotational element (sixth element) RE6. The vertical line Y7 corresponds to a seventh rotational element (seventh element) RE7 and expresses the first ring gear R1, the second planetary carrier CA2, and the third planetary carrier CA3 that are mutually coupled together. The second ring gear R2 and the third sun gear S3 that correspond to an eighth rotational element (eighth element) RE8 and are mutually coupled together are expressed. The distances between these lines are determined corresponding to the gear ratios ρ1, ρ3, and ρ3 of the three (first to third) planetary gear mechanisms 131, 132, and 133. That is, as illustrated in FIG. 17, for each of the (first to third) planetary gear mechanisms 131, 132, and 133, the distance between the sun gear and the planetary carrier corresponds to "1" while the distance between the planetary carrier and the ring gear corresponds to ρ.

With expression using the collinear diagram in FIG. 17, regarding the driving device 101 of this example, in the electrical differential unit (continuously-variable shifting unit) 120 illustrated in FIG. 14, the first rotational element RE1 (the planetary carrier CA0) that is one of the three rotational elements (elements) of the planetary gear mechanism 122 is coupled to the input shaft 111 and selectively coupled to the sun gear S0 that is one of the other rotational elements via the switching clutch C0. The second rotational element RE2 (the sun gear S0) that is one of the rotational elements other than this rotational element is coupled to the first motor-generator MG1 and selectively coupled to the transmission case 101A via the switching brake B0. Additionally, the third rotational element RE3 (the ring gear R0) that is the remaining rotational element is constituted to be coupled to the transmission shaft 123 and the second motor-generator MG2 so as to transmit (input) the rotation of the input shaft 111 to the mechanical gear shifting unit (the step-variable transmission) 30 via the transmission shaft 123. At this time, an oblique straight line L0 passing through the intersection point of Y2 and X2 represents the relationship between the rotation speed of the sun gear S0 and the rotation speed of the ring gear R0.

For example, when the state is switched to the continuously-variable shifting state by releasing the switching clutch C0 and the switching brake B0 described above, the reactive force due to electric generation by the first motor-generator MG1 is controlled to increase or decrease the rotation of the sun gear S0 illustrated at the intersection point between the straight line L0 and the vertical line Y1. This control causes a decrease or increase in rotation speed of the ring gear R0 illustrated at the intersection point between the straight line L0 and the vertical line Y3. When the engagement of the switching clutch C0 causes the sun gear S0 and the first planetary carrier CA1 to be coupled together, the above-described three rotational elements become a locked state that provides integral rotation. Accordingly, the straight line L0 match the horizontal line X2, and the transmission shaft 123 rotates in the same way as the rotation at the engine rotation speed Ne. Additionally, when the engagement of the switching brake B0 stops the rotation of the sun gear S0, the straight line L0 becomes the state illustrated in FIG. 17. Therefore, the rotation speed of the first ring gear R0 illustrated at the intersection point between the straight line L0 and the vertical line Y3, that is, the rotation speed of the transmission shaft 123 is input to an automatic gear shifting portion 20 by rotation at an increased rotation speed compared with the engine rotation speed Ne.

In the mechanical gear shifting unit 130, as illustrated in FIG. 17, the respective engagements of the first clutch C1 and the third brake B3 allows indicating the rotation speed of the output shaft 112 at the first speed at the intersection point between an oblique straight line L1 and the vertical line Y7. The straight line L1 passes through: the intersection point between the vertical line Y8 illustrating the rotation speed of the eighth rotational element RE8 and the horizontal line X2; and the intersection point between the vertical line Y6 illustrating the rotation speed of the sixth rotational element RE6 and the horizontal line X1. The vertical line Y7 indicates the rotation speed of the seventh rotational element RE7 coupled to the output shaft 112.

Similarly, the rotation speed of the output shaft 112 at the second speed is indicated at the intersection point between an oblique straight line L2 and the vertical line Y7. The straight line L2 is determined by the respective engagements of the first clutch C1 and the second brake B2. The vertical line Y7 indicates the rotation speed of the seventh rotational element RE7 coupled to the output shaft 112. The rotation speed of the output shaft 112 at the third speed is indicated at the intersection point between an oblique straight line L3 and the vertical line Y7. The straight line L3 is determined by the respective engagements of the first clutch C1 and the first brake B1. The vertical line Y7 indicates the rotation speed of the seventh rotational element RE7 coupled to the output shaft 112. The rotation speed of the output shaft 112 at the fourth speed is indicated at the intersection point between a horizontal straight line L4 and the vertical line Y7. The straight line L4 is determined by the respective engagements of the first clutch C1 and the second clutch C2. The vertical line Y7 indicates the rotation speed of the seventh rotational element RE7 coupled to the output shaft 112.

At the first speed to the fourth speed described above, the switching clutch C0 is engaged. Accordingly, the power from the electrical differential unit 120 is input to the eighth rotational element RE8 at the same rotation speed as the engine rotation speed Ne. On the other hand, engaging the switching brake B0 instead of the switching clutch C0 causes an input of the power from the electrical differential unit 120 at a rotation speed higher than the engine rotation speed Ne. Accordingly, the rotation speed of the output shaft 112 at the fifth speed is indicated at the intersection point between a horizontal straight line L5 and the vertical line Y7. The straight line L5 is determined by the respective engagements of the first clutch C1, the second clutch C2, and the switching brake B0. The vertical line Y7 indicates the rotation speed of the seventh rotational element RE7 coupled to the output shaft 112. The rotation speed of the output shaft 112 in the reverse R is indicated at the intersection point between an oblique straight line LR and the vertical line Y7. The straight line LR is determined by the respective engagements of the second clutch C2 and the third brake B3. The vertical line Y7 indicates the rotation speed of the seventh rotational element RE7 coupled to the output shaft 112.

Engaging or releasing the clutches C0 to C2 and the brakes B0 to B3 that constitute the driving device 101 described above is controlled by a hydraulic control circuit 160 and the hybrid ECU 201 (see FIG. 15).

—Shift Operation Device—

Figure 18:
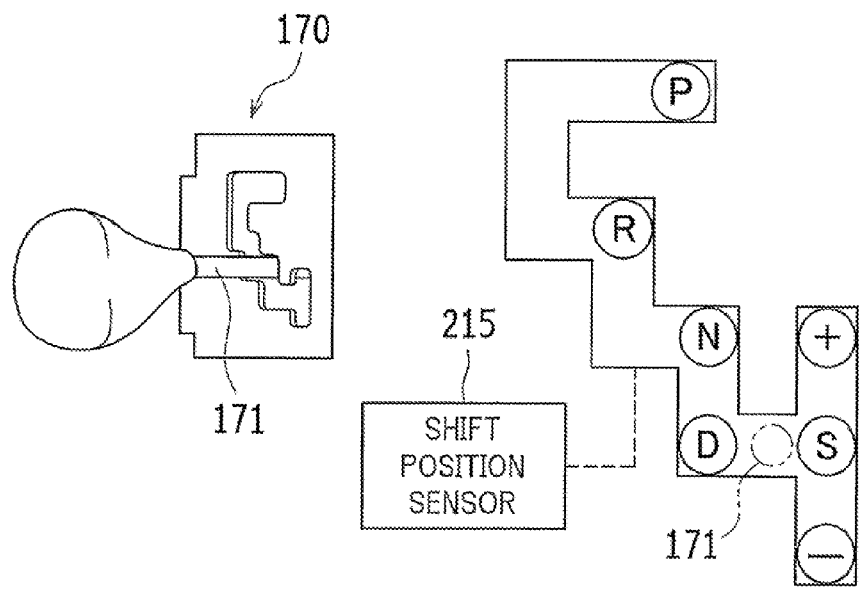
FIG. 18 includes a main perspective view of a shift operation device mounted on the hybrid vehicle in FIG. 14 (FIG. 18A) and a diagram illustrating a shift gate of the shift operation device (FIG. 18B).

In the hybrid vehicle 100 of this embodiment, a shift operation device 170 as illustrated in FIG. 18A is arranged in the vicinity of the driver's seat. At the shift operation device 170, a shift lever 171 is shiftably disposed.

The shift operation device 170 in this example sets, as illustrated in FIG. 18B, the parking position (P position), the reverse position (R position), the neutral position (N position), the drive position (D position), and the sequential position (S position) so as to allow the driver to shift the shift lever 171 to a desired shifting position. Each position of these P position, R position, N position, D position, and S position (also including the "+" position and the "−" position below) is detected by a shift position sensor 215.

In a state where the above-described shift lever 171 is operated to the "D position", the hybrid system is set to the "automatic gear shift mode."

On the other hand, in a state where the above-described shift lever 171 is operated to the "S position", the hybrid system is set to the "manual gear shift mode (sequential shift mode (S mode))." In the front and back of this S position, a "+" position and a "−" position are disposed. The "+" position is a position to which the shift lever 171 is operated when the manual up-shift is performed. The "−" position is a position to which the shift lever 171 is operated when the manual down-shift is performed. When the shift lever 171 is in the S position, operating the shift lever 171 to the "+" position or the "−" position from the S position as the neutral position (manual gear shift operation) allows up-shifting or down-shifting the gear shift position of the driving device 101 in the step-variable shifting state. Specifically, the gear shift position is shifted up by one stage (for example, 1st to 2nd to 3rd to 4th to 5th) for every operation to the "+" position. On the other hand, the gear shift position is shifted down by one stage (for example, 5th to 4th to 3rd to 2nd to 1st) for every operation to the "−" position.

Also in this embodiment, the paddle switches 9c and 9d (see FIG. 2) are disposed at the steering wheel 9b, similarly to [Embodiment 1] described above. When the shift-up paddle switch 9c is operated (operated to be pulled to the near side), the gear shift position is shifted up by one stage for every operation. On the other hand, when the shift-down paddle switch 9d is operated (operated to be pulled to the near side), the gear shift position is shifted down by one stage for every operation.

—Gear-Shift Instruction Device—

Also in the hybrid vehicle 100 according to this embodiment, a gear-shift instruction device similar to that in [Embodiment 1] described above is mounted.

That is, also in the hybrid vehicle 100 of this embodiment, the combination meter 6 illustrated in FIG. 8 is arranged in front of the driver's seat in the vehicle cabin. In this combination meter 6, the speedometer 61, the tachometer 62, the water temperature gauge 63, the fuel gauge 64, the odometer 65, the trip meter 66, various warning indicator lamps, and similar member are arranged.

In this combination meter 6, a gear-shift instruction device is disposed for instructing selection of an appropriate gear shift position (gear position) to ensure improvement in fuel consumption corresponding to the running state of the hybrid vehicle 100 and similar improvement. This gear-shift instruction device will be described below.

In the combination meter 6, as displaying portions for gear shift instruction, the shift-up lamp 67 and the shift-down lamp 68 are arranged. The shift-up lamp 67 is turned on during instruction of up-shifting the gear shift position. The shift-down lamp 68 is turned on during instruction of down-shifting the gear shift position. These shift-up lamp 67 and shift-down lamp 68 are constituted of, for example, LEDs and controlled to be turned on and off by the GSI-ECU 205 (see FIG. 15). These shift-up lamp 67, shift-down lamp 68, and GSI-ECU 205 constitute a gear-shift instruction unit according to the present invention. Here, as a possible configuration, the GSI-ECU 205 may be excluded, and the engine ECU 202 or the power management ECU (not illustrated) may control turning on and off the shift-up lamp 67 and the shift-down lamp 68.

—ECU—

The hybrid ECU 201 is an electronic control device that transmits and receives control signals and data signals to/from the engine ECU 202, which controls the operation of the engine 110, the motor ECU 203, which controls drives of the motor-generators MG1 and MG2, and the battery ECU 204, which manages the battery 302, and that executes various controls including the operation control of the engine 110, the driving controls of the motor-generators MG1 and MG2, the cooperative control of the engine 110 and the motor-generators MG1 and MG2, and similar control.

The hybrid ECU 201 includes a CPU, a ROM, a RAM, a backup RAM, and similar member.

The ROM stores various control programs, a map referenced during the execution of these various control programs, and similar information. The CPU executes the various control programs stored in the ROM and various arithmetic processings based on the map. The RAM is a memory that temporarily stores the result of the arithmetic operation in the CPU, data received from each sensor, and similar information. The backup RAM is a non-volatile memory that stores, for example, data to be stored during the stop of the engine 110 and similar data.

Here, the engine ECU 202, the motor ECU 203, the battery ECU 204, and the GSI-ECU 205 also each include the CPU, the ROM, the RAM, the backup RAM, and similar member.

As illustrated in FIG. 15, the hybrid ECU 201 is coupled to an engine rotation speed sensor 211, an output-shaft rotation speed sensor 212, a throttle position sensor 213, an accelerator position sensor 214, the shift position sensor 215, the MG1 rotation speed sensor 216, the MG2 rotation speed sensor 217, a power switch 218, a current sensor 219, a battery temperature sensor 220, a vehicle speed sensor 221, and similar sensor. The engine rotation speed sensor 211 detects the rotation speed (engine rotation speed) of the crankshaft 11 that is the output shaft of the engine 110. The output-shaft rotation speed sensor 212 detects the rotation speed of the output shaft 112. The throttle position sensor 213 detects the degree of opening of the throttle valve in the engine 110. The accelerator position sensor 214 detects the degree of opening of the accelerator pedal. The current sensor 219 detects the charge/discharge current of the battery 302. The vehicle speed sensor 221 detects the vehicle speed of the hybrid vehicle 100. Furthermore, the hybrid ECU 201 is coupled to sensors indicating the operating state of the engine 110, for example, a water temperature sensor, which detects the engine cooling water temperature and an air flow meter, which detects the intake air amount. The hybrid ECU 201 receives respective signals from these sensors. Here, the sensors indicating the operating state of the engine 110 and similar member may be coupled to the engine ECU 202.

Additionally, the hybrid ECU 201 receives data related to the state of the battery 302 and similar information via communication with the battery ECU 204. To manage the battery 302, the battery ECU 204 calculates the remaining capacity SOC of the battery 302, the input limitation (charging limit) Win, and the output limitation (discharging limit) Wout of the battery 302, and similar parameter based on the integrated value of the charge/discharge current detected by the above-described current sensor 219, the battery temperature detected by the above-described battery temperature sensor 220, and similar information.

The hybrid ECU 201 outputs an instruction signal (a solenoid control signal or similar signal) for performing a gear shift control of the driving device 101, to the hydraulic control circuit 160. Based on this instruction signal, energization and non-energization of a linear solenoid valve or similar member of the hydraulic control circuit 160 or similar state is controlled. For example, the clutches C0 to C2 and the brakes B0 to B3 of the driving device 101 are engaged or released to set a predetermined state (see FIG. 16), so as to form a predetermined gear shift position (the first speed (1st) to the fifth speed (5th)).

Furthermore, the hybrid ECU 201 executes the following [Running Control], [Automatic Gear Shift Control], and [Shift Instruction Control during S Mode].

[Running Control]

The hybrid ECU 201 transmits output requests to the engine ECU 202 and the motor ECU 203 based on the output signals of the above-described various sensors so as to control the driving force. Specifically, the hybrid ECU 201 calculates the required torque (driving force) Tr of the driver based on the accelerator operation amount Acc and the vehicle speed V with reference to a map (for example, a required-torque setting map as illustrated in FIG. 4) and similar information. The hybrid ECU 201 transmits output requests to the engine ECU 202 and the motor ECU 203 to obtain that required torque Tr, so as to control drives of the engine 110 and the motor-generator MG for running control of the hybrid vehicle HV.

For example, in the case where the operational efficiency of the engine 110 is poor at the time of starting, during low-speed running, or similar situation, running by the motor-generator MG alone (hereinafter referred to as "EV running" in other words) is performed. Also in the case where the driver selects the EV running mode using the running-mode selecting switch arranged in the vehicle cabin, EV running is performed. Here, a state where running is performed while the engine 110 is driven is referred to as HV running.

During HV running, the engine 110 is driven such that the engine 110 outputs the power corresponding to the required torque Tr so as to perform running (engine running) with this power of the engine 110.

During high-speed running in HV running, electric power from the battery (battery for running) 302 is additionally supplied to the motor-generator MG to increase the output of this motor-generator MG so as to add a driving force (driving force assistance; power running) to the drive wheels 150L and 150R. Furthermore, during deceleration (during coast running) the motor-generator functions as an electric generator and generates regenerative power to perform a control for storing the recovered electric power in the battery 302.

Here, in the case where the amount of charge in the battery 302 is reduced and charging is especially required, the output of the engine 110 is increased to increase the power generation amount by the motor-generator MG so as to increase the amount of charge to the battery 302. Also during low-speed running, a control for increasing the driving amount of the engine 110 as necessary may be performed, for example, in the case where charging the battery 302 is required as described above, in the case where an auxiliary machine such as an air conditioner is driven, and in the case where the temperature of the cooling water for the engine 110 is increased to a predetermined temperature.

[Gear Shift Control]

This embodiment allows selecting between the automatic gear shift mode and the S mode (the manual gear shift mode). The automatic gear shift mode allows automatic gear shifting of the driving device 101 corresponding to the vehicle running state (the accelerator position Acc and the vehicle speed V). The S mode allows manual gear shifting of the driving device 101 corresponding to the operation of the driver. The respective modes will be described. Here, in the S mode, the driving device 101 performs a step-variable shifting operation.

(Automatic Gear Shift Mode)

Firstly, a description will be given of a shift line map used for the gear shift control of this example with reference to FIG. 19.

Figure 19:
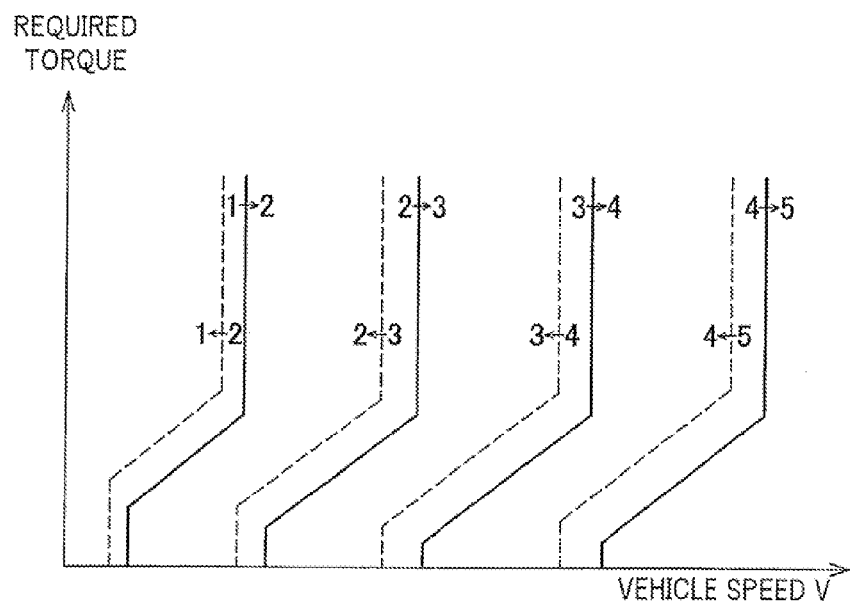
FIG. 19 is a graph illustrating another example of the shift line map.

The shift line map illustrated in FIG. 19 is a map that employs the vehicle speed V and the required torque as parameters and sets a plurality of regions for obtaining an appropriate gear shift position (a recommended gear shift position with the optimal fuel consumption) corresponding to these vehicle speed V and required torque. The shift line map is stored in the ROM of the hybrid ECU 201. The respective regions in the shift line map are partitioned by a plurality of shift lines (the gear change lines of the gear shift positions). In the shift line map illustrated in FIG. 19, an up-shift line (shift line) is illustrated by a solid line and a down-shift line (shift line) is illustrated by a dashed line. Respective switching directions of the up-shift and the down-shift are illustrated using numbers and arrows in the drawing.

Next, the basic operation of the automatic gear shift control will be described.

The hybrid ECU 201 obtains the vehicle speed V from the output signal of the vehicle speed sensor 221 and obtains the accelerator position Acc from the output signal of the accelerator position sensor 214. The hybrid ECU 201 calculates the recommended gear shift position (target gear shift position) with reference to the shift line map in FIG. 19 based on these vehicle speed V and accelerator position Acc to compare the recommended gear shift position and the gear shift position at the present time (the current gear shift position) so as to determine whether or not a gear shift operation is necessary.

In the case where the gear shifting is not necessary based on the determination result (in the case where the recommended gear shift position and the current gear shift position are the same and the gear shift position is appropriately set), a gear shift command is not output to the hydraulic control circuit 160 and the current gear shift position is held.

On the other hand, in the case where the recommended gear shift position and the current gear shift position are different from each other, the gear shift control is performed. For example, the running state of the vehicle changes from the condition of running in a state where the gear shift position of the driving device 101 (in the step-variable shifting state) is the "third gear shift position" and crosses, for example, a down-shifting line [3 to 2] illustrated in FIG. 19, the recommended gear shift position calculated from the shift line map becomes a "second gear shift position." Additionally, the gear shift command for setting the second gear shift position is output to the hydraulic control circuit 160 to shift gears from the third gear shift position to the second gear shift position (3 to 2 down shifting).

Here, the gear shift position at the present time (the current gear shift position) of the driving device 101 can be recognized from, for example, the respective engaged and released states of the clutches C0 to C2 and the brakes B0 to B3 that constitute the driving device 101 (see FIG. 16). The engaged and released states of the clutches C0 to C2 and the brakes B0 to B3 can be detected by an oil pressure switch and similar method. Additionally, the ratio (gear shift ratio) between the rotation speed of the input shaft 111 and the rotation speed of the output shaft 112 in the driving device 101 is obtained so as to obtain the current gear shift position from this gear shift ratio.

Here, in the case where the automatic gear shift mode is selected, the driving device 101 may perform the continuously-variable shifting operation depending on the operating state (for example, the vehicle speed V, the accelerator position Acc, and similar state) of the hybrid vehicle 100.

(S Mode)

Next, the S mode will be described.

Firstly, in this embodiment, when the shift lever 171 (see FIG. 18) of the above-described shift operation device 170 is switched from the D position to the S position (S mode), an S mode signal is output from the shift position sensor 107 to the hybrid ECU 201 so as to perform a transition to the S mode that allows the switching operation of the range with a sequential shift-matic transmission.

In the case where the S mode is set, the hybrid ECU 201 executes a control (range hold control) for performing automatic gear shifting within, for example, a range of the limited gear shift positions (limited gear shift ratios) in which the current gear shift position of the driving device 101 (in the step-variable shifting state) is set to the upper-limit gear shift position and the upper-limit gear shift position (the lower-limit gear shift ratio) is set to the gear shift position at the highest side (the gear shift ratio at the lowest side).

Specifically, in the case where the gear shift position when the mode is switched to the S mode is, for example, the third gear shift position (3rd), the third gear shift position is set to the upper-limit gear shift position, and this state is set to allow the automatic gear shifting (the automatic gear shift control based on the above-described shift line map) of the driving device 101 between the third gear shift position (3rd) and the first gear shift position (1st).

In the case where the shift lever 171 is operated to the "−" side (shift-down operation) one time in a state where the upper-limit gear shift position is the third gear shift position, the upper-limit gear shift position is changed to the second gear shift position (2nd) and this state is set to allow the automatic gear shifting (the automatic gear shift control based on the above-described shift line map) of the driving device 101 between the second gear shift position (2nd) and the first gear shift position (1st).

On the other hand, in the case where the shift lever 171 is operated to the "+" side (shift-up operation) one time in a state where the upper-limit gear shift position is the third gear shift position, the upper-limit gear shift position is changed to the fourth gear shift position (4th) and this state is set to allow the automatic gear shifting (the automatic gear shift control based on the above-described shift line map) of the driving device 101 between the fourth gear shift position (4th) and the first gear shift position (1st).

Here, regarding the upper-limit gear shift position when the shift lever 171 is switched from the D position to the S position (S mode), a one-stage lower gear shift position (the second gear shift position) or a one-stage higher gear shift position (the fourth gear shift position) than the gear shift position (for example, the third gear shift position) of the driving device 101 at the time of the switching may be set to the upper-limit gear shift position.

—Shift Instruction Control During S Mode—

Also in this embodiment, during EV running in the S mode, the occasions of the gear shift guide (display of the shift instruction) is reduced compared with those during HV running so as to reduce the burden felt by the driver. A description will be given of an example of a specific control (a shift instruction control during the S mode) for realizing this effect with reference to a flowchart in FIG. 20.

Figure 20:
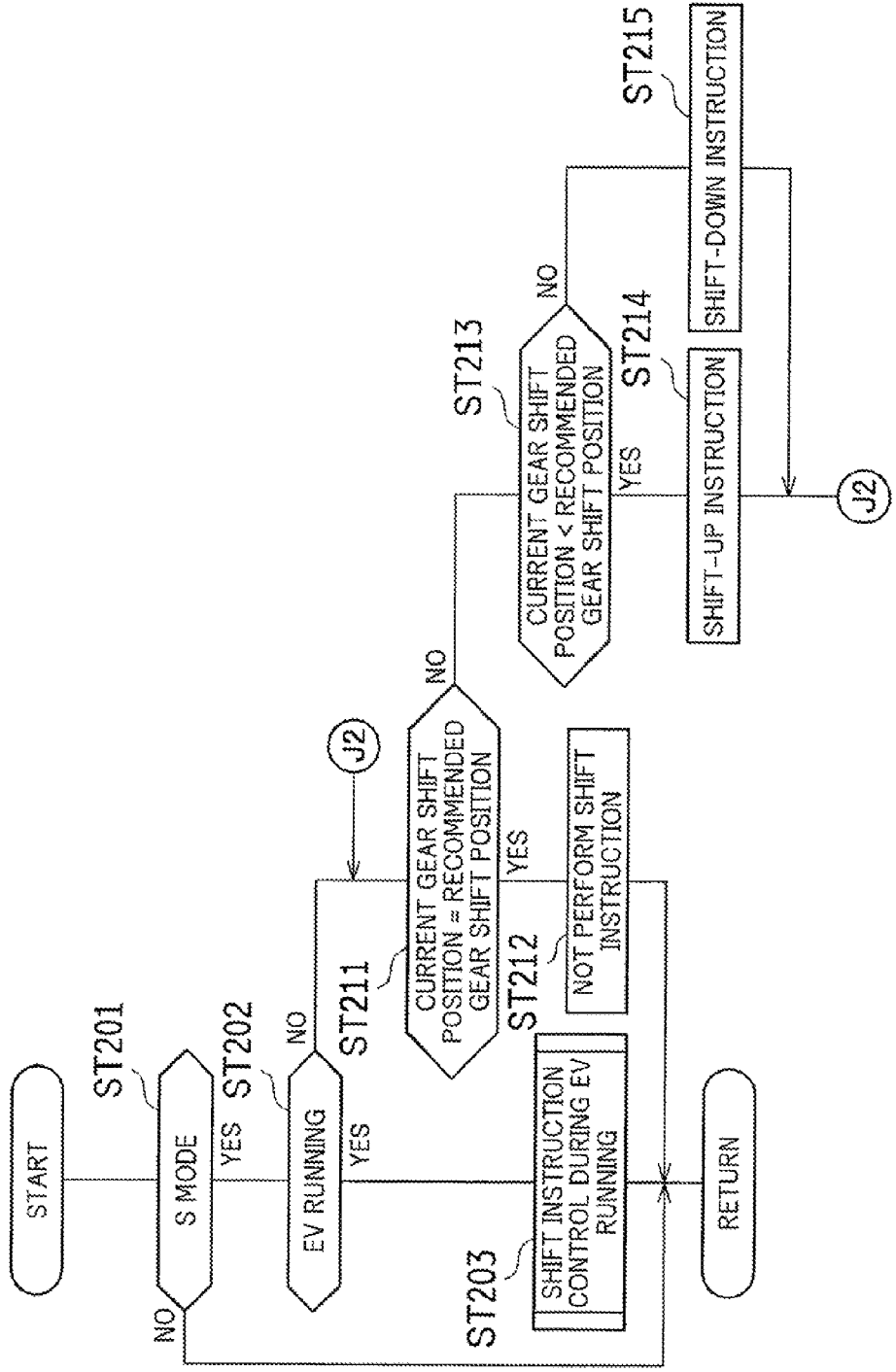
FIG. 20 is a flowchart illustrating another example of the shift instruction control during the S mode.

The control routine in FIG. 20 is repeatedly executed in the hybrid ECU 201 at a predetermined time interval (for example, every several msec).

When the control routine in FIG. 20 is started, firstly, it is determined whether or not the S mode (manual gear shift mode) is selected in step ST201 based on the output signal of the shift position sensor 215. In the case where the determination result is a negative determination (NO), the process returns. In the case where the determination result in step ST201 is an affirmative determination (YES), the process proceeds to step ST202.

In step ST202, it is determined whether or not the current running state of the hybrid vehicle 100 is "EV running." In the case where the determination result in this step ST202 is a negative determination (NO), that is, in case of "HV running" in a state where the engine 110 is driven, the process proceeds to step ST211. Here, the determination of "EV running" is made based on, for example, the instruction signal transmitted from the hybrid ECU 201 to the motor ECU 13.

In step ST211, the current vehicle speed V is obtained from the output signal of the vehicle speed sensor 221, and the current accelerator position Acc is obtained from the output signal of the accelerator position sensor 214. These vehicle speed V and accelerator position Acc are used to obtain the required torque Tr with reference to a map (for example, the required-torque setting map as illustrated in FIG. 4). Based on this required torque Tr and the above-described vehicle speed V or accelerator Acc, the recommended gear shift position (target gear shift position) is obtained with reference to the shift line map illustrated in FIG. 19. Subsequently, the recommended gear shift position and the current gear shift position of the driving device 101 (in the step-variable shifting state) are compared with each other to determine whether or not the recommended gear shift position and the current gear shift position are the same. In the case where the determination result is an affirmative determination (YES) (in the case of [the current gear shift position=the recommended gear shift position]), the shift-up instruction by the above-described gear-shift instruction device is not performed (in step ST212). Here, the vehicle speed V may be calculated from the output signal of the output-shaft rotation speed sensor 212.

In the case where the determination result in step ST211 described above is a negative determination (NO) (in the case where the recommended gear shift position and the current gear shift position are different from each other), the process proceeds to step ST213. In step ST213, it is determined whether or not the current gear shift position is a lower gear shift position than the recommended gear shift position (the current gear shift position<the recommended gear shift position). In the case where the determination result is an affirmative determination (YES), the process proceeds to step ST214.

In step ST214, a control signal for issuing an shift-up command is transmitted from the hybrid ECU 201 to the GSI-ECU 16, and the shift-up lamp 67 is turned on (see FIG. 9A). This turning on of the shift-up lamp 67 (the shift-up instruction) continues until the determination result in step ST211 becomes an affirmative determination (YES). Subsequently, when the driver operates the shift lever 171 to the "+" position (or operates the shift-up paddle switch 9c) in response to this shift-up instruction (gear shift guide) by turning on the shift-up lamp 67, an shift-up operation is performed in the hybrid system. At the time point when the current gear shift position and the recommended gear shift position coincide with each other by this shift-up operation (at the time point when the determination result in step ST211 becomes an affirmative determination (YES)), the shift-up lamp 67 is turned off, and the shift instruction by the above-described gear-shift instruction device is not performed (in step ST212).

In the case where the determination results in step ST211 and step ST213 described above are both negative determinations (NO), that is, in the case where the current gear shift position is a higher gear shift position than the recommended gear shift position (the current gear shift position>the recommended gear shift position), the process proceeds to step ST215.

In step ST215, a control signal for issuing a down-shift command is transmitted from the hybrid ECU 201 to the GSI-ECU 16, and the shift-down lamp 68 is turned on (see FIG. 9B). This turning on of the shift-down lamp 68 (shift-down instruction) continues until the determination result in step ST211 becomes an affirmative determination (YES). Subsequently, when the driver operates the shift lever 171 to the "−" position (or operates the shift-down paddle switch 9d) in response to this shift-down instruction (gear shift guide) by turning on the shift-down lamp 68, a shift-down operation is performed in the hybrid system. At the time point when the current gear shift position and the recommended gear shift position coincide with each other by this shift-down operation (at the time point when the determination result in step ST211 becomes an affirmative determination (YES)), the shift-down lamp 68 is turned off, and the shift instruction by the above-described gear-shift instruction device is not performed (in step ST212).

On the other hand, in the case where the determination result in step ST202 described above is an affirmative determination (YES), that is, in the case where the current running state of the hybrid vehicle 100 is "EV running," a subroutine of the shift instruction control during EV running is executed in step ST203. This subroutine of the shift instruction control during EV running will be described with reference to FIG. 21.

Figure 21:
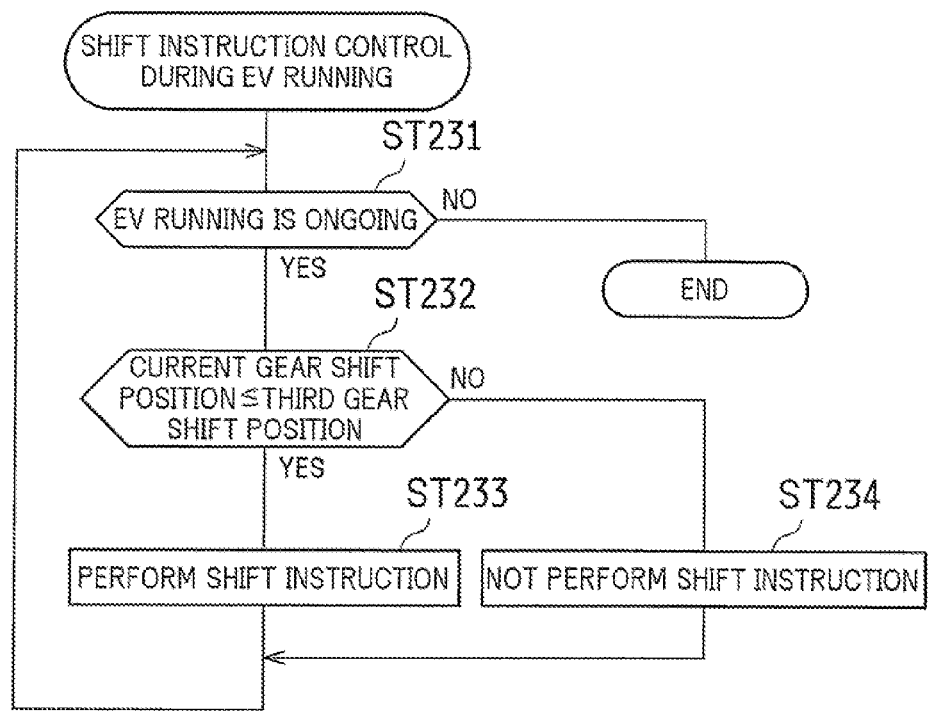
FIG. 21 is a flowchart illustrating another example of the shift instruction control during EV running.

When this subroutine in FIG. 21 is started, firstly, it is determined whether or not EV running is ongoing in step ST231. In the case where the determination result is a negative determination (NO), the process of this subroutine is terminated, and the process returns to the main routine in FIG. 20. In the case where the determination result in step ST231 is an affirmative determination (YES), the process proceeds to step ST232.

In step ST232, it is determined whether or not the current gear shift position of the driving device 101 (in the step-variable shifting state) is equal to or less than the third gear shift position (3rd) (the current gear shift position the third gear shift position). In the case where the determination result is a negative determination (NO), the gear shift instruction is prohibited (the gear shift guide is prohibited). Subsequently, the process of this subroutine is terminated, and the process returns to the main routine in FIG. 20. In the case where the determination result in step ST232 is an affirmative determination (YES), the process proceeds to step ST233.

In step ST233, the shift instruction is performed. Specifically, a process similar to step ST211 to step ST215 in the above-described flowchart of FIG. 20 is executed. That is, in the case where the recommended gear shift position (target gear shift position) is obtained with reference to the shift line map illustrated in FIG. 19, and then the recommended gear shift position and the current gear shift position coincide with each other, the shift instruction by the above-described gear-shift instruction device is not performed. Here, this non-performance of the shift instruction is also included in the gear shift guide. On the other hand, in the case where the current gear shift position is a lower gear shift position than the recommended gear shift position (the current gear shift position<the recommended gear shift position), the shift-up lamp 67 is turned on to issue a shift-up instruction (gear shift guide). In the case where the current gear shift position is a higher gear shift position than the recommended gear shift position (the current gear shift position>the recommended gear shift position), the shift-down lamp 68 is turned on to issue a shift-down instruction (gear shift guide).

This process in steps ST232 to ST234 is repeatedly executed while EV running continues. In the case where the running state of the hybrid vehicle 100 has changed from EV running (in the case where the determination result in step ST231 becomes a negative determination (NO)), this subroutine is terminated, and the process returns to the main routine in FIG. 20.

As described above, with this embodiment, during EV running in the S mode, the gear shift guide (gear shift instruction) is not performed on all the gear shift positions (five forward speeds) of the driving device 101 (gear shifting unit). The gear shift position on which the gear shift guide is performed is limited up to the third gear shift position (limited to 3rd to 1st). This allows reducing occasions of the gear shift guide during EV running (occasions of the gear shift instruction that prompts gear shifting) compared with during HV running. This allows reducing the burden felt by the driver during EV running.

In the above-described embodiment, in the case where the gear shift position of the driving device 101 (gear shifting unit) has five forward gears, the gear shift position that permits the gear shift instruction (gear shift guide) is limited to be equal to or less than the third gear shift position (3rd). This should not be construed in a limiting sense. The gear shift position that permits the gear shift instruction (gear shift guide) may be equal to or less than the fourth gear shift position or equal to or less than the second gear shift position. The number of stages of the gear shift position of the driving device 101 (gear shifting unit) is not limited to five forward gears. For example, the present invention is applicable to a hybrid vehicle that includes a power transmission system with a gear shifting unit for any other forward gears (multiple stages) such as six forward gears and eight forward gears.

The shift instruction control (the control routine in FIG. 20 and FIG. 21) during the S mode described in this [Embodiment 2] is also applicable to [Embodiment 1] described above.

(Modification 2-1)

A description will be given of another example of the subroutine of the shift instruction control during EV running executed in step ST203 in the above-described flowchart of FIG. 20 with reference to FIG. 22. This subroutine in FIG. 22 can also be executed in the hybrid ECU 201.

Figure 22:
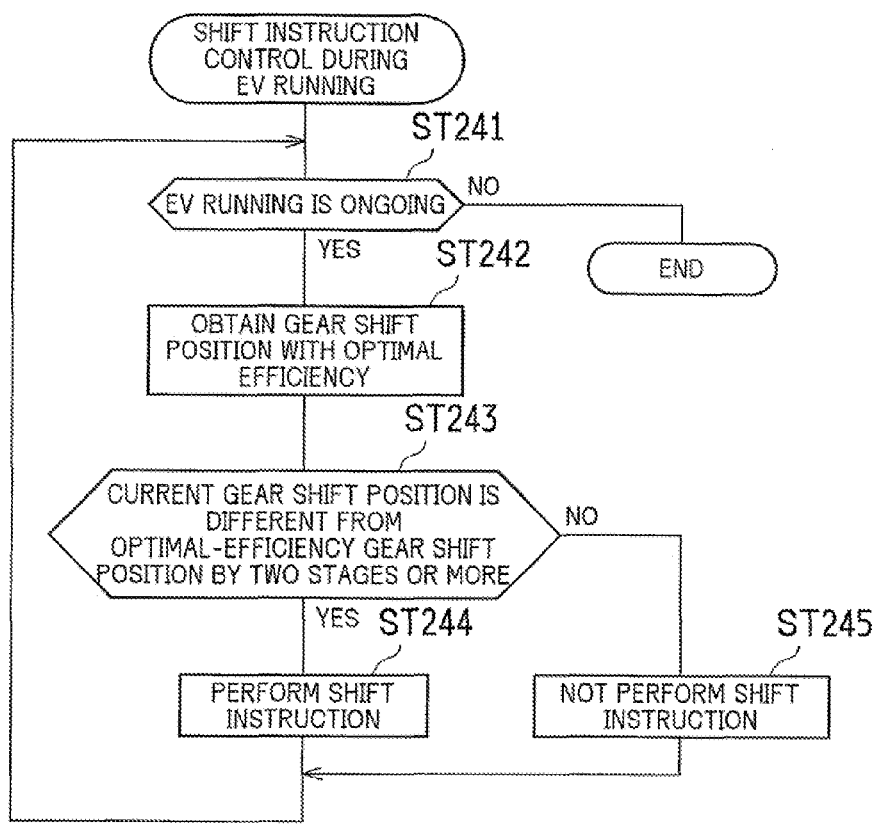
FIG. 22 is a flowchart illustrating another example of the shift instruction control during EV running

When the subroutine in FIG. 22 is started, firstly, it is determined whether or not EV running is ongoing in step ST241. In the case where the determination result is a negative determination (NO), the process of this subroutine is terminated, and the process returns to the main routine in FIG. 20. In the case where the determination result in step ST241 is an affirmative determination (YES), the process proceeds to step ST242.

In step ST242, the gear shift position (the optimal-efficiency gear shift position) in which the second motor-generator MG2 has an optimal efficiency is obtained.

Figure 23:
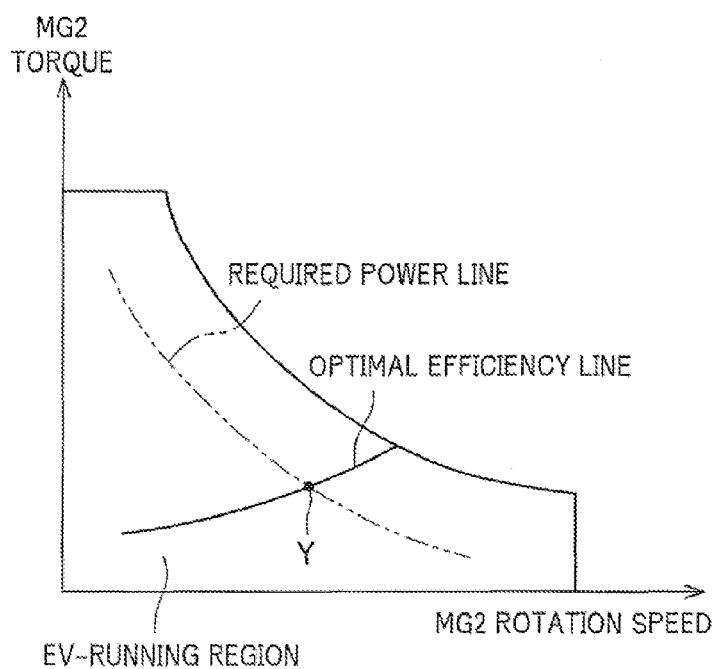
FIG. 23 is a graph illustrating an example of an optimal efficiency line and a required power line of a second motor-generator MG2.

Specifically, as illustrated in FIG. 23, the intersection point (the point Y in the drawing) between an optimal efficiency line of the second motor-generator MG2 and a correlation curve (required power line) indicating a constant required power Pmg2 (Nmg2×Tr) is obtained. At this intersection point, a rotation speed Nmg2 of the second motor-generator MG2 is obtained. Subsequently, based on the rotation speed Nmg2 (the input-shaft rotation speed of the mechanical gear shifting unit 130) of the second motor-generator MG2 and the current vehicle speed V (recognized from the output signal of the vehicle speed sensor 221), the gear shift ratio of the power transmission system between the second motor-generator MG2 and the drive wheels 150L and 150R is obtained. Subsequently, the optimal-efficiency gear shift position at the optimal efficiency is obtained among the five forward speeds of the driving device 101 based on the gear shift ratio. Here, the rotation speed Nmg2 of the second motor-generator MG2 can be obtained from the output signal of the MG2 rotation speed sensor 217.

Subsequently, in step ST243, it is determined whether or not the current gear shift position of the driving device 101 (in the step-variable shifting state) is different from the optimal-efficiency gear shift position obtained in step ST242 described above by two stages or more. In the case where the determination result is a negative determination (NO) (in the case where the current gear shift position is the same as the optimal-efficiency gear shift position, or the current gear shift position is mismatched from the optimal-efficiency gear shift position by only one stage), the shift-up instruction by the above-described gear-shift instruction device is not performed (in step ST245), and the process returns to step ST241.

On the other hand, in the case where the determination result in step ST243 is an affirmative determination (YES) (in the case where the current gear shift position is different from the optimal-efficiency gear shift position by two stages or more), the process proceeds to step ST244.

In step ST244, the shift instruction is performed. Specifically, a process similar to step ST211 to step ST215 in the above-described flowchart of FIG. 20 is executed. That is, in the case where the recommended gear shift position (target gear shift position) is obtained with reference to the shift line map illustrated in FIG. 19, and then the recommended gear shift position and the current gear shift position coincide with each other, the shift instruction by the above-described gear-shift instruction device is not performed. Here, this non-performance of the shift instruction is also included in the gear shift guide. On the other hand, in the case where the current gear shift position is a lower gear shift position than the recommended gear shift position (the current gear shift position<the recommended gear shift position), the shift-up lamp 67 is turned on to issue a shift-up instruction (gear shift guide). In the case where the current gear shift position is a higher gear shift position than the recommended gear shift position (the current gear shift position>the recommended gear shift position), the shift-down lamp 68 is turned on to issue a shift-down instruction (gear shift guide).

This process in steps ST242 to ST245 is repeatedly executed while EV running continues. Subsequently, in the case where the running state of the hybrid vehicle 100 has changed from EV running (in the case where the determination result in step ST241 becomes a negative determination (NO)), this subroutine is terminated, and the process returns to the main routine in FIG. 20.

According to this example, during EV running in the manual gear shift mode, the gear shift instruction (gear shift guide) is performed only in the case where the current gear shift position is different from the gear shift position in which the second motor-generator MG2 has the optimal efficiency by two stages or more. This allows reducing occasions of the gear shift guide during EV running compared with during HV running. This allows reducing the burden felt by the driver during EV running. Moreover, the operation point of the second motor-generator MG2 during EV running is allowed to be close to the optimal efficiency line (see FIG. 23). This improves the operational efficiency of the second motor-generator MG2, thus reducing the energy consumption.

Here, the shift instruction control during the S mode (the control routines in FIG. 20 and FIG. 21) described in this (Modification 2-1) is applicable to [Embodiment 1] above described.

(Modification 2-2)

A description will be given of another example of the subroutine of the shift instruction control during EV running executed in step ST203 in the above-described flowchart of FIG. 20 with reference to FIG. 24. This subroutine in FIG. 24 can be executed in the hybrid ECU 201.

Figure 24:
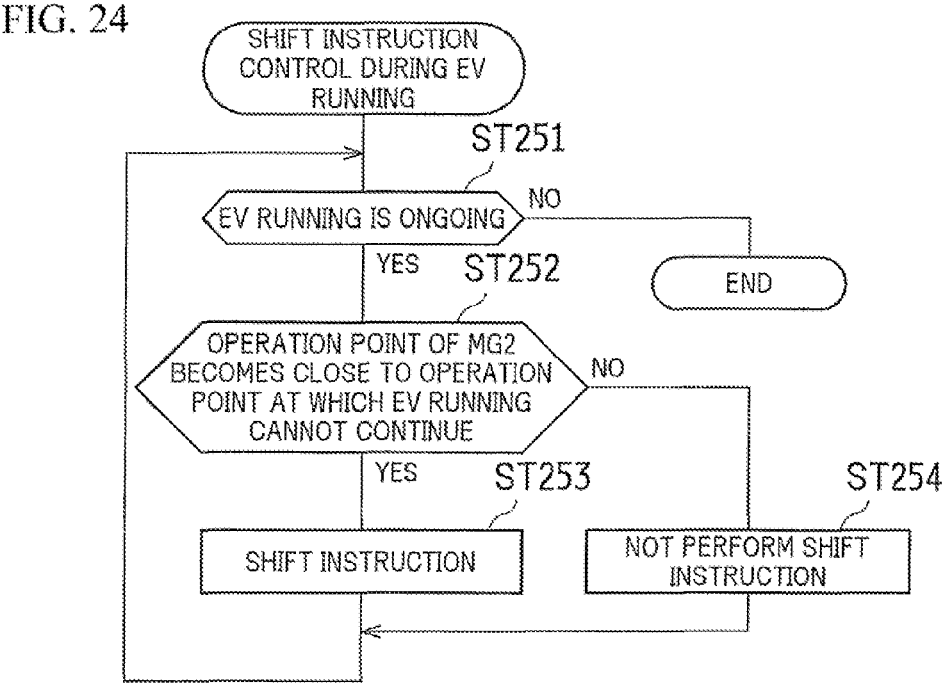
FIG. 24 is a flowchart illustrating another example of the shift instruction control during EV running

When the control routine in FIG. 24 is started, firstly, it is determined whether or not EV running is ongoing in step ST251. In the case where the determination result is a negative determination (NO), the process of this subroutine is terminated, and the process returns to the main routine in FIG. 20. In the case where the determination result in step ST251 is an affirmative determination (YES), the process proceeds to step ST252.

In step ST252, it is determined whether or not the operation point of the second motor-generator MG2 becomes close to the operation point at which EV running cannot continue. Specifically, based on the in-EV-running indication-permission determination map (stored in the ROM of the hybrid ECU 201) illustrated in FIG. 13, it is determined whether or not the operation point of the second motor-generator MG2 becomes inside of the in-EV-running shift-instruction region. For example, as illustrated in FIG. 13, in the case where the operation point of the second motor-generator MG2 transitions from the operation point Px to the operation point Py, it is determined that "the operation point of the second motor-generator MG2 becomes close to the operation point at which EV running cannot continue." Subsequently, the process proceeds to step ST253. In the case where the determination result in step ST252 is a negative determination (NO), the shift-up instruction by the above-described gear-shift instruction device is not performed (in step ST254), and the process returns to step ST251.

In step ST253, the shift instruction is performed. Specifically, a process similar to step ST211 to step ST215 in the above-described flowchart of FIG. 20 is executed. That is, in the case where the recommended gear shift position (target gear shift position) is obtained with reference to the shift line map illustrated in FIG. 19, and then the recommended gear shift position and the current gear shift position coincide with each other, the shift instruction by the above-described gear-shift instruction device is not performed. Here, this non-performance of the shift instruction is also included in the gear shift guide. On the other hand, in the case where the current gear shift position is a lower gear shift position than the recommended gear shift position (the current gear shift position<the recommended gear shift position), the shift-up lamp 67 is turned on to issue the shift-up instruction (gear shift guide). In the case where the current gear shift position is a higher gear shift position than the recommended gear shift position (the current gear shift position>the recommended gear shift position), the shift-down lamp 68 is turned on to issue the shift-down instruction (gear shift guide).

This process in steps ST252 to ST254 is repeatedly executed while EV running continues. Subsequently, in the case where the running state of the hybrid vehicle 100 has changed from EV running (in the case where the determination result in step ST251 becomes a negative determination (NO)), this subroutine is terminated, and the process returns to the main routine in FIG. 20.

As described above, with this modification, during EV running in the S mode, the gear shift instruction (gear shift guide) is performed only in the case where the operation point of the second motor-generator MG2 becomes close to the operation point (the boundary line CL) at which EV running cannot continue. This allows reducing occasions of the gear shift guide during EV running compared with during HV running. This allows reducing the burden felt by the driver during EV running Here, in this [Embodiment 2], it may be configured that the gear shift guide is not performed (the shift instruction is not displayed) during EV running in the S mode.

Embodiment 3

While in [Embodiment 1] and [Embodiment 2] described above the example in which the present invention is applied to the hybrid vehicle HV on which the two motor-generators MG1 and MG2 are mounted has been described, the present invention is not limited to this. The present invention is also applicable to the hybrid vehicle on which one motor-generator is mounted. One example will be described with reference to FIG. 25.

The hybrid vehicle in this example is a front-engine rear-drive (FR) hybrid vehicle 400, and includes an engine 401, a motor-generator (MG) 403, a transmission (a step-variable type automatic transmission (for example, with five forward gears)) 405, an inverter 411, a battery 412, an ECU 410, and similar member. The inverter 411 drives the motor-generator 403. The battery 412 supplies electric power for driving the motor-generator 403 and store electric power generated by the motor-generator 403. The engine 401 and the motor-generator 403 are coupled together via a first clutch 402. The motor-generator 403 and the transmission 405 are coupled to each other via a second clutch 404. These crankshaft of the engine 401, first clutch 402, motor-generator 403, second clutch 404, transmission 405, and similar member constitute a driving power transmission system according to the present invention.

Figure 25:
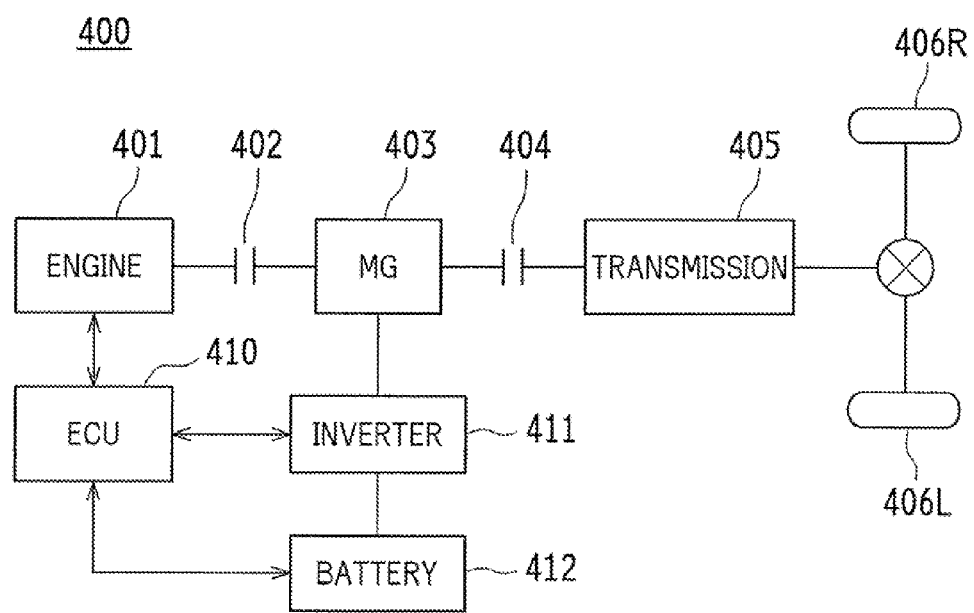
FIG. 25 is a schematic configuration diagram illustrating another example of the hybrid vehicle to which the present invention is applied.

In the hybrid vehicle 400 illustrated in FIG. 25, the first clutch 402 is cut off (released), and the second clutch 404 is coupled (engaged). This allows EV running in which the motor-generator 403 alone drives drive wheels (rear wheels) 406L and 406R.

Both couplings (engagements) of the first clutch 402 and the second clutch 404 allow HV running in which the drive wheels 406L and 406R are driven by the driving force of the engine 401 and allow charging or generating an assist torque by the motor-generator 403.

Here, the hybrid vehicle 400 in this embodiment also includes the shift operation device 9, the paddle switches 9c and 9d, and similar member as illustrated in FIG. 2. When the shift lever 91 of the shift operation device 9 is switched from the D position to the S position (S mode), an S mode signal is output to the ECU 410 from a shift position sensor (not illustrated) so as to perform a transition to the S mode that allows the switching operation of the range with a sequential shift-matic transmission in this configuration.

Furthermore, the hybrid vehicle 400 in this embodiment also is equipped with, as displaying portions for gear shift instruction, a functional unit that constitutes the gear-shift instruction device, for example, the combination meter 6 (see FIG. 8) in which the shift-up lamp 67 and the shift-down lamp 68 are arranged. The shift-up lamp 67 is turned on during instruction of up-shifting the gear shift position. The shift-down lamp 68 is turned on during instruction of down-shifting the gear shift position.

Also in the hybrid vehicle 400 of this embodiment, the control equivalent to the shift instruction control (the control routines in FIG. 20 and FIG. 21) during the S mode described in [Embodiment 2] above may be executed to perform the gear shift guide in which the gear shift position is limited up to a predetermined gear shift position (limited up to the third gear shift position (3rd)) among a plurality of gear shift positions (five forward speeds) of the transmission 405 during EV running in the sequential shift mode (S mode).

Additionally, the control equivalent to the shift instruction control during EV running (the control routine in FIG. 22) described in (Modification 2-1) of [Embodiment 2] above may be executed to perform the gear shift guide (gear shift instruction) only in the case where the current gear shift position is different from the gear shift position in which the motor-generator 403 has the optimal efficiency by two stages or more during EV running in the S mode.

Additionally, the control equivalent to the shift instruction control during EV running (the control routine in FIG. 24) described in (Modification 2-2) of [Embodiment 2] above may be executed to perform the gear shift guide (gear shift instruction) only in the case where the operation point of the second motor-generator 403 becomes close to the operation point (the boundary line CL) at which EV running cannot continue during EV running in the S mode.

Additionally, in the hybrid vehicle 400 illustrated in FIG. 25, it may be configured that the gear shift guide is not performed (the shift instruction is not displayed) during EV running in the S mode.

As described above, also in this embodiment, the modes of the guide for gear shift (gear shift instruction) are different between during HV running and during EV running in the S mode for the same accelerator depression amount and vehicle speed. This allows reducing occasions of the gear shift guide (occasions of the shift instruction) during EV running, thus reducing the burden felt by the driver during EV running.

Other Embodiments

In the present invention, in the state that allows manual gear shift operation (the manual gear shift mode), the modes of the guide for gear shift are different between during EV running and during HV running so as to perform, for the same accelerator depression amount and vehicle speed, for example, a gear shift instruction for optimizing the fuel consumption during HV running while performing a gear shift instruction focusing on the driving performance during EV running.

In the present invention, during EV running (or during an EV running priority state) in a state that allows manual gear shift operation (the manual gear shift mode), a guide restriction may be set to reduce occasions of the gear shift guide compared with during HV running (or during an HV running priority state). Setting this guide restriction also ensures the compatibility between: improvement in energy efficiency and fuel consumption by the gear shift instruction; and reduction in burden of the driver due to gear shifting based on the gear shift instruction.

While in [Embodiment 1] described above the example in which the present invention is applied to the FF hybrid vehicle HV has been described, the present invention is not limited to this. The present invention may be applied to an FR or 4WD hybrid vehicle.

While in [Embodiment 1] described above the example in which the present invention is applied to what is called a split-type hybrid vehicle HV with the two motor-generators MG1 and MG2 and the power split mechanism 3 has been described, the present invention is not limited to this. The present invention may be applied to what is called a series or parallel hybrid vehicle. Here, the series hybrid vehicle is a hybrid vehicle in which an engine is used only for electric generation as an electric generator and drive wheels are driven only by a motor. The parallel hybrid vehicle is a hybrid vehicle in which drive wheels are driven by an engine and a motor.

While in [Embodiment 1] to [Embodiment 3] described above the example in which the present invention is applied to the control of the hybrid vehicle on which the two motor-generator or one motor-generator is mounted has been described, the present invention is applicable to a control of a hybrid vehicle that includes three or more motor-generators and at least one of these motor-generators assists a running drive force of the vehicle.

The present invention is also applicable to, as a gear-shift system, a range hold type (that allows automatic gear shifting to a low gear shift position side with respect to the selected gear shift position) and a gear hold type (that holds the selected gear shift position). Here, the range hold type is a control in which the hybrid ECU 10 or similar member sets the current gear shift position to the upper-limit gear shift position in the case where the shift lever is in the sequential position (S position) and performs automatic gear shifting within a range of the limited gear shift positions in which the upper-limit gear shift position is set to the gear shift position at the highest side (the gear shift ratio at the lowest side). For example, in the case where the gear shift position in the manual gear shift mode is the third speed gear stage (3rd), the third speed gear stage is set to the upper-limit gear shift position, and an automatic gear shifting is possible between the third speed gear stage (3rd) and the first speed gear stage (1st) in this state.

INDUSTRIAL APPLICABILITY

The present invention is effectively used for a gear-shift instruction device that can perform a gear shift instruction (gear shift guide) for a driver in a hybrid vehicle on which an engine and an electric motor (a motor or a motor-generator) are mounted as power sources for running

DESCRIPTION OF REFERENCE SIGNS 1, 100 hybrid vehicle
2, 110 engine
3 power split mechanism (gear shifting unit)
120 electrical differential unit
130 mechanical gear shifting unit
6a, 6b, 150L, 150R drive wheel
10, 201 hybrid ECU
16, 205 GSI-ECU
24, 302 battery
52, 214 accelerator position sensor
54, 221 vehicle speed sensor
67 shift-up lamp
68 shift-down lamp
MG1 first motor-generator
MG2 second motor-generator

The invention claimed is:

1. A gear-shift instruction device for a hybrid vehicle, wherein
the hybrid vehicle includes:
an engine configured to output power for running;
an electric motor configured to output power for running;
a gear shifting unit configured to perform manual gear shifting, the gear shifting unit being disposed at a power transmission system, the power transmission being configured to transmit power to a drive wheel; and
a gear-shift instruction unit configured to perform gear shift guide for prompting a manual gear shift operation of the gear shifting unit, wherein
modes of the guide for gear shift are different between during electric motor running and during hybrid running for a same accelerator depression amount and vehicle speed in a state that allows the manual gear shift operation, the electric motor running allowing running only with the power of the electric motor, the hybrid running allowing running in a state where the engine is operated.

2. The gear-shift instruction device for the hybrid vehicle according to claim 1, wherein
the guide for gear shift by the gear-shift instruction unit is not performed during the electric motor running in the state that allows the manual gear shift operation.

3. The gear-shift instruction device for the hybrid vehicle according to claim 1, wherein
the gear shifting unit is configured to shift multi-stage gears by manual gear shifting, and
in the state that allows the manual gear shift operation, a gear shift position subjected to a gear shift instruction is limited during the electric motor running compared with during the hybrid running.

4. The gear-shift instruction device for the hybrid vehicle according to claim 1, wherein
the gear shifting unit is configured to shift multi-stage gears by manual gear shifting, and
in the state that allows the manual gear shift operation, when a gear shift position difference from an optimal gear shift position is large during the electric motor running compared with during the hybrid running, a gear shift instruction is performed.

5. The gear-shift instruction device for the hybrid vehicle according to claim 1, wherein
a gear shift instruction is performed only in a case where an operation point of the electric motor in the state that allows the manual gear shift operation becomes close to an operation point at which the electric motor running by the electric motor cannot continue, to a predetermined degree.

6. A gear-shift instruction device for a hybrid vehicle, wherein
the hybrid vehicle includes:
an engine configured to output power for running;
an electric motor configured to output power for running;
a gear shifting unit configured to perform manual gear shifting, the gear shifting unit being disposed at a power transmission system, the power transmission being configured to transmit power to a drive wheel; and
a gear-shift instruction unit configured to perform gear shift guide for prompting a manual gear shift operation of the gear shifting unit, wherein
modes of the guide for gear shift are different between during an electric motor running priority state and during a hybrid running priority state for a same accelerator depression amount and vehicle speed in a state that allows the manual gear shift operation.

7. The gear-shift instruction device for the hybrid vehicle according to claim 6, wherein
the guide for gear shift by the gear-shift instruction unit is not performed during the electric motor running priority state in the state that allows the manual gear shift operation.

8. The gear-shift instruction device for the hybrid vehicle according to claim 6, wherein
the gear shifting unit is configured to shift multi-stage gears by manual gear shifting, and
in the state that allows the manual gear shift operation, a gear shift position subjected to a gear shift instruction is limited during the electric motor running priority state compared with during the hybrid running priority state.

9. The gear-shift instruction device for the hybrid vehicle according to claim 6, wherein
the gear shifting unit is configured to shift multi-stage gears by manual gear shifting, and
in the state that allows the manual gear shift operation, when a gear shift position difference from the optimal gear shift position is large during the electric motor running priority state compared with during the hybrid running priority state, a gear shift instruction is performed.

10. The gear-shift instruction device for the hybrid vehicle according to claim 6, wherein
the gear shift instruction is performed only in a case where an operation point of the electric motor in the state that allows the manual gear shift operation becomes close to an operation point at which the electric running by the electric motor cannot continue, to a predetermined degree.

* * * * *